US011391835B2

(12) United States Patent
Lee et al.

(10) Patent No.: US 11,391,835 B2
(45) Date of Patent: Jul. 19, 2022

(54) APPARATUS AND METHOD FOR TRACKING MOVEMENT OF ELECTRONIC DEVICE

(71) Applicant: Samsung Electronics Co., Ltd., Gyeonggi-do (KR)

(72) Inventors: Dongkyu Lee, Gyeonggi-do (KR); Yongwook Kim, Gyeonggi-do (KR); Jungho Ahn, Gyeonggi-do (KR)

(73) Assignee: Samsung Electronics Co., Ltd

( * ) Notice: Subject to any disclaimer, the term of this patent is extended or adjusted under 35 U.S.C. 154(b) by 424 days.

(21) Appl. No.: 16/269,245

(22) Filed: Feb. 6, 2019

(65) Prior Publication Data
US 2019/0242989 A1 Aug. 8, 2019

(30) Foreign Application Priority Data
Feb. 6, 2018 (KR) .................. 10-2018-0014681

(51) Int. Cl.
*G01S 13/87* (2006.01)
*G01S 13/86* (2006.01)
(Continued)

(52) U.S. Cl.
CPC .......... *G01S 13/876* (2013.01); *G01S 13/765* (2013.01); *G01S 13/86* (2013.01); *H04L 67/01* (2022.05)

(58) Field of Classification Search
CPC ...... G01S 13/876; G01S 13/765; G01S 13/86; H04L 67/42
(Continued)

(56) References Cited

U.S. PATENT DOCUMENTS

| 9,974,467 B2* | 5/2018 | Blahnik ................ G06F 3/0482 |
| 10,788,326 B2* | 9/2020 | Cline ..................... H04W 4/02 |

(Continued)

FOREIGN PATENT DOCUMENTS

| EP | 2387202 A1 * | 11/2011 | ........... G06F 3/0488 |
| EP | 2945136 A1 * | 11/2015 | .............. G01S 11/06 |

(Continued)

OTHER PUBLICATIONS

Qui Chen et al. "CRISP: cooperation among smartphones to improve indoor positon information", wireless Networks, ACM, 2 Penn Plaza, Suite 701-New York USA, vol. 24, No. 3, Sep. 29, 2016, pp. 867-884, XP036452260, ISSN: 1022-0038, DOI: 10.1007/S11276-016-1373-1. (Year: 2016).*

(Continued)

*Primary Examiner* — Bernarr E Gregory
*Assistant Examiner* — Nuzhat Pervin
(74) *Attorney, Agent, or Firm* — The Farrell Law Firm, P.C.

(57) ABSTRACT

A method for locating positions of electronic devices is provided. The method includes receiving, by a master electronic device, movement information of the electronic devices, and setting the electronic devices to a first reference device, a second reference device, or a normal electronic device, based on the movement information, calculating, by the first reference device, a distance between the first reference device and the second reference device and a distance between the first reference device and the normal electronic device, calculating, by the second reference device, a distance between the second reference device and the normal electronic device, and transmitting the calculated distance information to the first reference device, and calculating, by the first reference device, a position of the normal electronic device by a triangulation method, based on the distances (Continued)

among the first reference device, the second reference device, and the normal electronic device.

18 Claims, 22 Drawing Sheets

(51) Int. Cl.
  *G01S 13/76* (2006.01)
  *H04L 29/06* (2006.01)
  *H04L 67/01* (2022.01)
(58) Field of Classification Search
  USPC .......................................................... 342/125
  See application file for complete search history.

(56) References Cited

U.S. PATENT DOCUMENTS

| | | | |
|---|---|---|---|
| 11,257,023 B1* | 2/2022 | Rafii | H04L 67/52 |
| 2006/0012467 A1* | 1/2006 | Kade | B60T 7/22 |
| | | | 342/72 |
| 2006/0012476 A1 | 1/2006 | Markhovsky et al. | |
| 2008/0080441 A1* | 4/2008 | Park | H04W 64/00 |
| | | | 370/338 |
| 2010/0156708 A1* | 6/2010 | Chen | G01S 19/48 |
| | | | 342/451 |
| 2011/0074569 A1* | 3/2011 | Alsindi | G01S 5/0289 |
| | | | 340/539.1 |
| 2011/0135149 A1* | 6/2011 | Gefen | G01S 5/0257 |
| | | | 382/103 |
| 2013/0053061 A1* | 2/2013 | Kang | G01S 5/0289 |
| | | | 455/456.1 |
| 2013/0130712 A1* | 5/2013 | Karasudani | G01S 5/14 |
| | | | 455/456.1 |
| 2014/0334463 A1* | 11/2014 | Lipman | H04W 4/026 |
| | | | 370/338 |
| 2015/0312719 A1* | 10/2015 | Cho | G01S 5/0263 |
| | | | 455/456.1 |
| 2015/0326704 A1* | 11/2015 | Ko | H04M 1/72457 |
| | | | 455/456.3 |
| 2017/0135061 A1* | 5/2017 | Park | G01S 5/0289 |
| 2017/0150314 A1* | 5/2017 | Hwang | H04W 4/06 |
| 2017/0234965 A1* | 8/2017 | Taylor, Jr. | G01S 5/14 |
| | | | 340/539.13 |
| 2018/0017660 A1* | 1/2018 | Roquel | G01S 5/0252 |
| 2021/0232235 A1* | 7/2021 | Regani | G06F 3/03545 |

FOREIGN PATENT DOCUMENTS

| | | | | |
|---|---|---|---|---|
| FR | 3030053 A1 * | 6/2016 | .......... | G01S 5/0072 |
| KR | 1020170003608 | 1/2017 | | |
| WO | WO-2016003108 A1 * | 1/2016 | ......... | H04N 1/00106 |
| WO | WO-2016087794 A1 * | 6/2016 | .......... | G01S 5/0072 |
| WO | WO 2017/167372 | 10/2017 | | |
| WO | WO-2017167372 A1 * | 10/2017 | .............. | G01S 11/06 |

OTHER PUBLICATIONS

Qui Chen et al.: "CRISP: Cooperation Among Smartpones to Improve Indoor Positiion Information", Wireless Networks, XP036452260, Sep. 29, 2016, 18 pages.
European Search Report dated Dec. 23, 2020 issued in counterpart application No. 19751089.4-1206, 14 pages.
International Search Report dated May 17, 2019 issued in counterpart application No. PCT/KR2019/001293, 7 pages.
Indian Examination Report dated Sep. 15, 2021 issued in counterpart application No. 202017032653, 6 pages.
European Intention to Grant dated Apr. 19, 2022 issued in counterpart application No. 19751089.4-1206, 5 pages.

* cited by examiner

APPARATUS AND METHOD FOR TRACKING MOVEMENT OF ELECTRONIC DEVICE

CROSS-REFERENCE TO RELATED APPLICATION(S)

This application is based on and claims priority under 35 U.S.C. § 119 to Korean Patent Application Serial No. 10-2018-0014681, filed on Feb. 6, 2018, in the Korean Intellectual Property Office, the entire disclosure of which is incorporated herein by reference.

BACKGROUND

1. Field

The present disclosure relates generally to an apparatus and a method for locating positions of a plurality of moving electronic devices.

2. Description of Related Art

Positions of electronic devices may be located based on global positioning system (GPS) signals. In addition, a position locating method of a sensor network may locate positions by using a few anchor nodes knowing position information. The above-described related art position locating method should have a separate reference point (stations) (e.g., a GPS, an anchor node), and may locate the position of a moving electronic device with reference to the reference point.

In addition, a position locating method using a GPS is optimized to a linear movement, and may reduce accuracy in tracking movements of players in sports such as ball sports, etc., and cannot locate positions indoors or may not guarantee reliability in locating positions.

SUMMARY

The present disclosure has been made to address at least the disadvantages described above and to provide at least the advantages described below.

In accordance with an aspect of the present disclosure, an apparatus with at least three electronic devices to locate a position of at least one of the at least three electronic devices is provided. The apparatus includes a sensor module configured to track a movement of the an electronic device including the sensor module, a communication module configured to communicate with other electronic devices; a memory, and a processor operatively connected with the sensor module, the communication module, and the memory, and configured, based on instructions stored in the memory, to set each of the at least three electronic devices to a master electronic device, a first reference device, a second reference device, or a normal electronic device, respectively. The processor of the master electronic device may be configured to receive movement information of remaining electronic devices, and to set the remaining electronic devices to the first reference device, the second reference device, or the normal electronic device, respectively, based on the movement information. The processor of the first reference device may be configured to calculate a distance between the first reference device and the second reference device and a distance between the first reference device and the normal electronic device, to receive distance information between the second reference device and the normal electronic device, and to calculate positions of the normal electronic devices by a triangulation method, based on the distance information among the first reference device, the second reference device, and the normal electronic device. The processor of the second reference device may be configured to calculate a distance between the second reference device and the normal electronic device, and to transmit the calculated distance information to the first reference device.

In accordance with an aspect of the present disclosure, a method for locating positions of electronic devices is provided. The method includes receiving, by a master electronic device, movement information of the electronic devices, and setting the electronic devices to a first reference device, a second reference device, or a normal electronic device, based on the movement information, calculating, by the first reference device, a distance between the first reference device and the second reference device and a distance between the first reference device and the normal electronic device, calculating, by the second reference device, a distance between the second reference device and the normal electronic device, transmitting the calculated distance information to the first reference device, and calculating, by the first reference device, a position of the normal electronic device by a triangulation method, based on the distances among the first reference device, the second reference device, and the normal electronic device.

In accordance with an aspect of the present disclosure, a positioning system of electronic devices is provided. The system includes a master electronic device configured to receive movement information of the electronic devices, and to set the electronic devices to a first reference device, a second reference device, or a normal electronic device, respectively, based on the movement information, the first reference device configured to calculate a distance between the first reference device and the second reference device and a distance between the first reference device and the normal electronic device, to receive distance information between the second reference device and the normal electronic device, and to calculate a position of the normal electronic device by a triangulation method, based on the distance information among the first reference device, the second reference device, and the normal electronic device, the second reference device configured to calculate a distance between the second reference device and the normal electronic device, and to transmit the calculated distance information to the first reference device, and at least one normal electronic device configured to transmit a message for calculating distances to the reference devices to the first reference device and the second reference device.

In accordance with an aspect of the present disclosure, a method for locating a position in a positioning system is provided. The method includes setting, by a master electronic device, electronic devices to a first reference device, a second reference device, or a normal electronic device, respectively, based on movement information of the electronic devices, calculating, by the first reference device, a distance between the first reference device and the second reference device and a distance between the first reference device and the normal electronic device, calculating, by the second reference device, a distance between the second reference device and the normal electronic device, transmitting the calculated distance information to the first reference device, and calculating, by the first reference device, positions of the electronic devices by a triangulation method, based on the distance information among the first reference device, the second reference device, and the normal electronic device.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Hereinafter, various embodiments of the present disclosure will be described with reference to the accompanying drawings.

Figure 1:
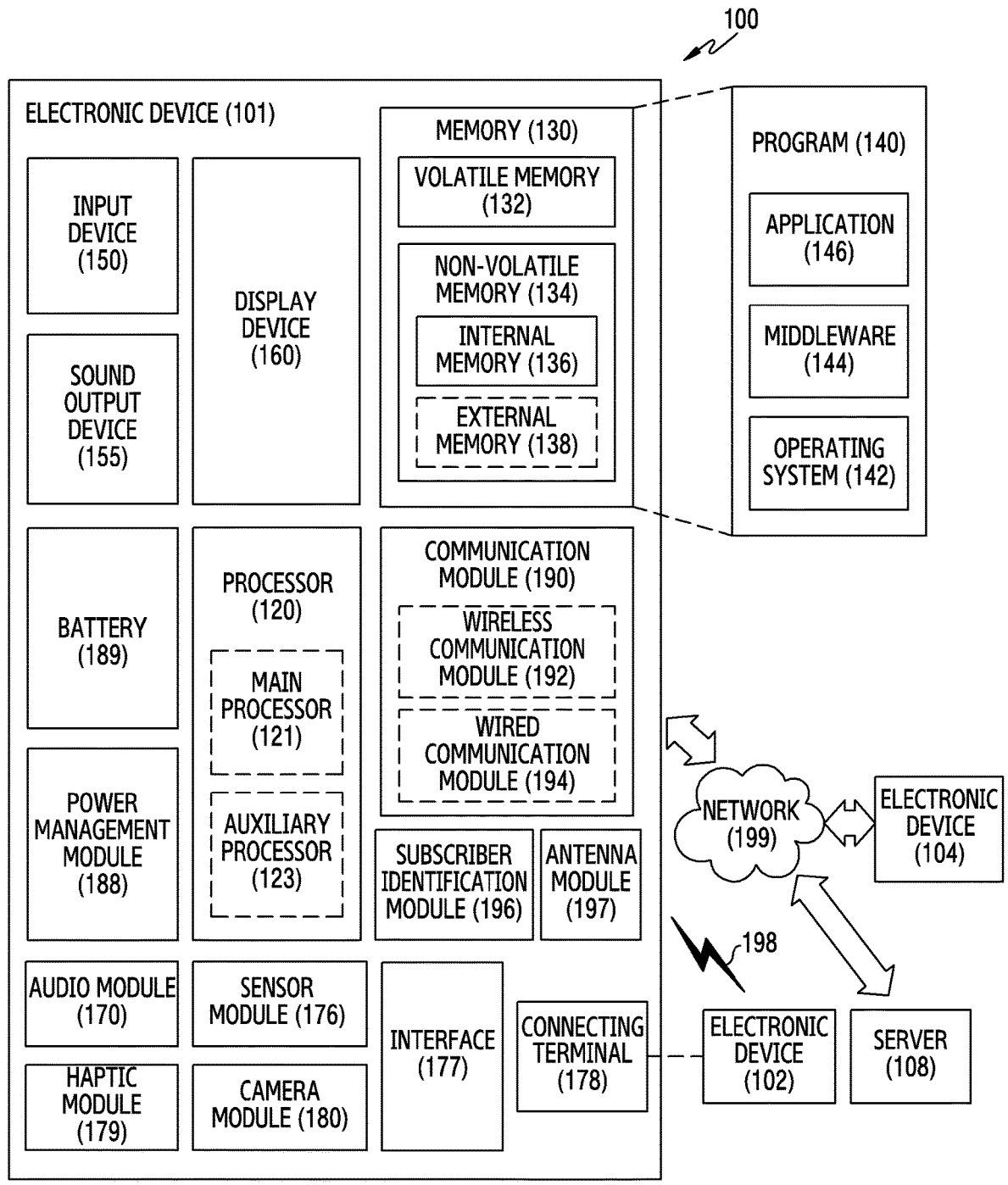
FIG. 1 is a diagram of an electronic device in a network environment, according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
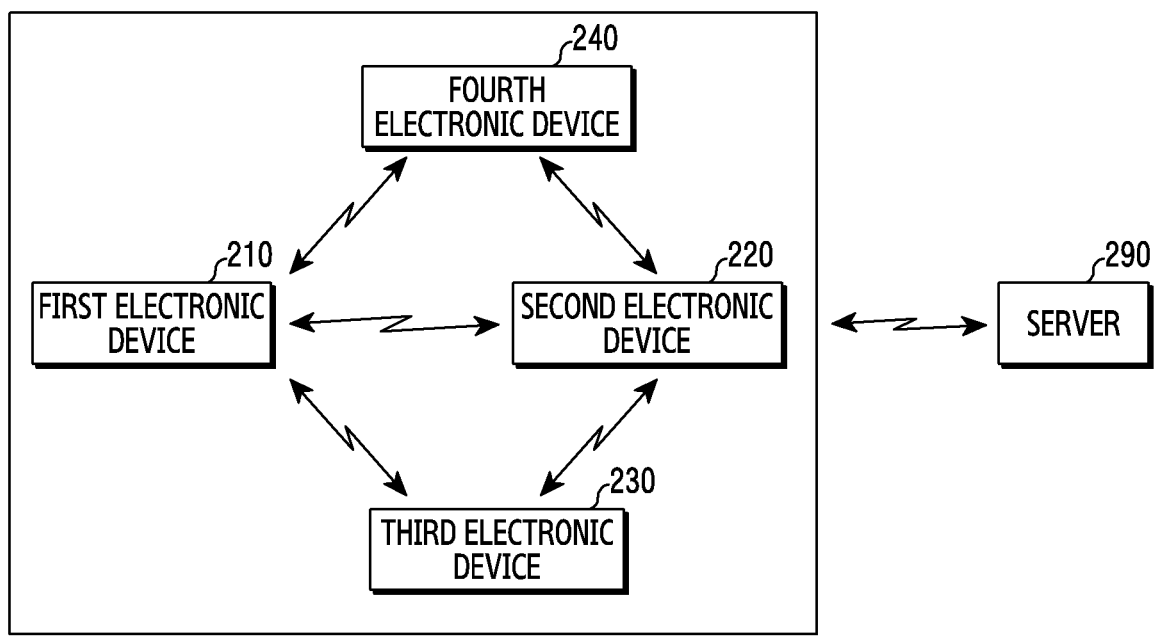
FIGS. 2A and 2B are diagrams of a method for locating a position of an electronic device, according to an embodiment.
Figure 2B:
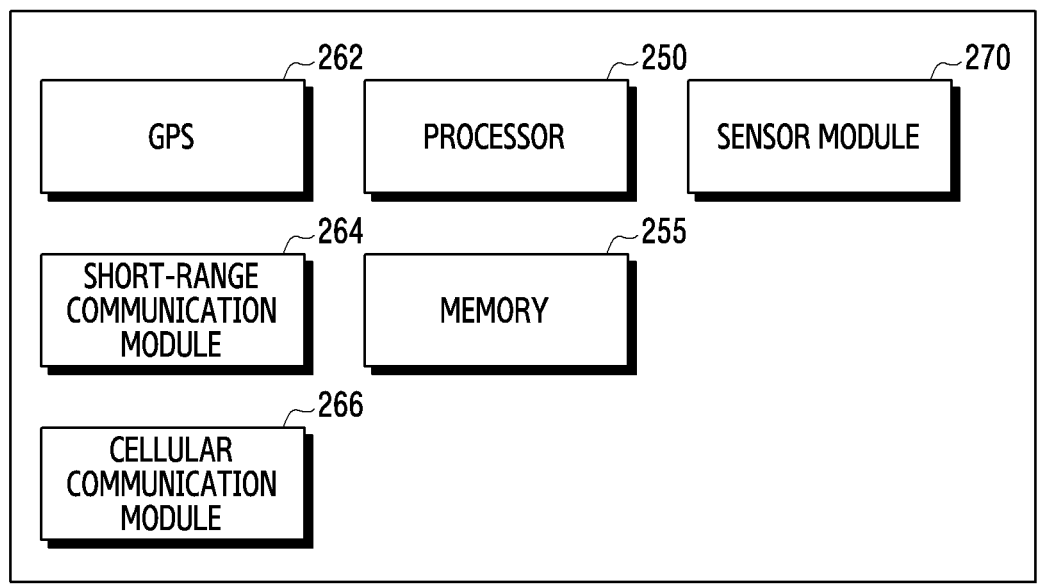

FIGS. 2A and 2B are diagrams of a method for locating a position of an electronic device, according to an embodiment.

Referring to FIG. 2A, a positioning system of an electronic device may include at least three electronic devices (FIG. 2A illustrates four electronic devices), and a server 290 processing by using positioning information of the electronic devices. The server 290 may be one of the electronic devices (e.g., electronic devices 210-240), or may be an independent electronic device. The electronic devices 210-240 may be wearable devices and may be worn on user's wrist or ankle.

FIG. 2B is a diagram a configuration of an electronic device 210-240, according to an embodiment. The electronic device 210-240 may include a processor 250, a memory 255, a global positioning system (GPS) (or global navigation satellite system (GNSS)), a short-range communication module 264, a cellular communication module 266, and a sensor module 270.

The memory 255 may store a program for setting an operation mode of the electronic device based on a movement (traveling) of the electronic device, and for setting a position of the electronic device based on the set operation mode. The memory 255 may store a program for setting the electronic device to operate as a first reference device, a second reference device, or a normal electronic device, and for executing a position setting operation in each operation mode. In addition, the first reference device may be converted into a master device at a next time, and may store a program for controlling an operation of setting a reference device.

The processor 250 may set an operation mode of the electronic device 210-240 by the program of the memory 255. The processor 250 may receive movement tracking messages including identification information and movement information of electronic devices by communicating with other electronic devices, may set the electronic device to the first reference device, the second reference device, or the normal electronic device, based on the received information, and may control execution of the operation of setting the position of the electronic device based on the set operation mode.

The GPS module 262 (e.g., the communication module 190) may receive GPS information for calibrating coordinates of the electronic device when locating the position of the electronic device. The short-range communication module 264 (e.g., the wireless communication module 192 of the communication module 190) may perform a function of communicating with other electronic devices to locate the position of the electronic device, and may transmit the measured position (coordinates) information of the electronic device to the server 290. The short-range communication module 264 may communicate information for measuring distances between electronic devices by performing an RF positioning function. The short-range communication module 264 may include an ultra-wide band (UWB) or WiFi. The cellular communication module 266 (e.g., the wireless communication module 192 of the communication module 190) may transmit information of the electronic device measured at the electronic device to other electronic devices and/or the server via a cellular network.

The sensor module 270 may detect movement information of the electronic device. The sensor module 270 may be an acceleration sensor (e.g., a six-axis acceleration sensor). The sensor module 270 may track a movement of a hand or foot on which the electronic device is worn.

The electronic device having the configuration as shown in FIG. 2B may locate the positions of the electronic devices by tracking movements of users and measuring the distances between the electronic devices based on the set operation mode.

The electronic devices 210-240 may measure their own movement indexes at the same time. The processor 250 of a master electronic device may request movement information from the electronic devices 210-240, and the electronic devices 210-240 may track their movements through the sensor modules 270, may generate messages including tracked movement indexes, and may transmit the generated messages to the master electronic device via the short-range communication modules 264. The processor 250 of the master electronic device which receives the messages may analyze the received messages and generate a resulting message table of the tracked movements, and then may transmit the resulting message table to all of the electronic devices 210-240 through the short-range communication module 264. Among the electronic devices 210-240, an electronic device with the least amount of movement may be set to a first reference device, an electronic device with a second least amount of movement may be set to a second reference device, and the other electronic devices may be set to normal electronic device, based on the resulting message table information. The master electronic device may analyze information received from the electronic devices 210-240, and may set the electronic device with the least amount of movement to the first reference device, and may set the electronic device with the second least amount of movement to the second reference device, based on the result of analysis, and then may include the information of the set electronic devices to the resulting message table and transmit the resulting message table.

FIG. 2A illustrates an example in which the first electronic device 210 is set to the first reference device, the second electronic device 220 is set to the second reference device, and the third electronic device 230 and the fourth electronic device 240 are set to the normal electronic devices.

The first reference device and the second reference device may calculate distances to the other electronic devices based on RF positioning technology. The RF positioning technology may use a time difference of arrival (TDOA) for a UWB communication method, or a RSSI in case of a WiFi communication method.

The processor 250 of the first electronic device 210, which is the first reference device, may communicate messages with the electronic devices 220-240 through the short-range communication module 264 according to an RF positioning method, and may calculate distances between the first electronic device 210 and the electronic devices 220-240 based on the result of communicating messages. The processor 250 of the second electronic device 220, which is the second reference device, may communicate messages with the other electronic devices 230, 240 except for the first electronic device 210, which is the first reference device, through the short-range communication module 264 in the RF positioning method. The second reference device may calculate distances between the second electronic device 220 and the electronic devices 230, 240 based on the RF positioning method. The second electronic device 220 may transmit the calculated distance information to the electronic devices 230, 240 to the first electronic device 210 which is the first reference device. The third reference device 230, 240 may communicate with the first reference device and the second reference device based on RF positioning technology.

When distance information is received from the second electronic device 220 which is the second reference device, the first electronic device 210 which is the first reference device may calculate positions (coordinates) to which the third electronic device 230 and the fourth electronic device 240 are moved, with reference to reference points of the first reference device (the first electronic device 210) and the second reference device (the second electronic device 220), based on the triangulation. The first reference device (the first electronic device 210) may transmit the calculated position information of the electronic devices to the server 290.

The server 290 may store refined position (coordinates) information of the electronic devices, transmitted from the first reference device, and may transmit the same to the electronic devices 210-240. The electronic devices 210-240 may refine or modify their own positions based on the coordinates information transmitted from the server 290. The server 290 may accumulate and manage the refined position information of the electronic devices 210-240. When indoor or outdoor team sport players wear the electronic devices, the server 290 may manage the accumulated position information as big data, and may exactly display positions and movements of the players according to a purpose (e.g., a heat map, a pass map, a shooting map, etc.).

After the position information of the electronic devices 210-240 is refined, the first reference device (e.g., the electronic device 210) may be converted into a master electronic device, and may perform the operation for setting an electronic device with a small amount of movement to a reference device at the next positioning time.

When the electronic device locates a position, the electronic device may first track a movement (traveling) from a previous tracking time to a current tracking time by using the sensor module 270, and may set two electronic devices with the least amount of movement (e.g., by measuring the number of steps of a user at the six-axis acceleration sensor of the sensor module 170) to reference devices, and may utilize the two electronic devices as positioning reference points. Second, the first reference device and the second reference device may measure distances between the electronic devices by using RF positioning such as UWB/WiFi (RSSI) of the short-range communication module 264. Third, the reference devices may locate the positions of the electronic devices by the triangulation based on the measured distances between the electronic devices. The positioning system provided with the plurality of electronic devices as described above can locate positions (coordinates) of the electronic devices without having to install a separate reference point (station). The above-described positioning system can exactly locate positions of players in an indoor team sport/outdoor team sport, and can exactly track movements.

Figure 3:
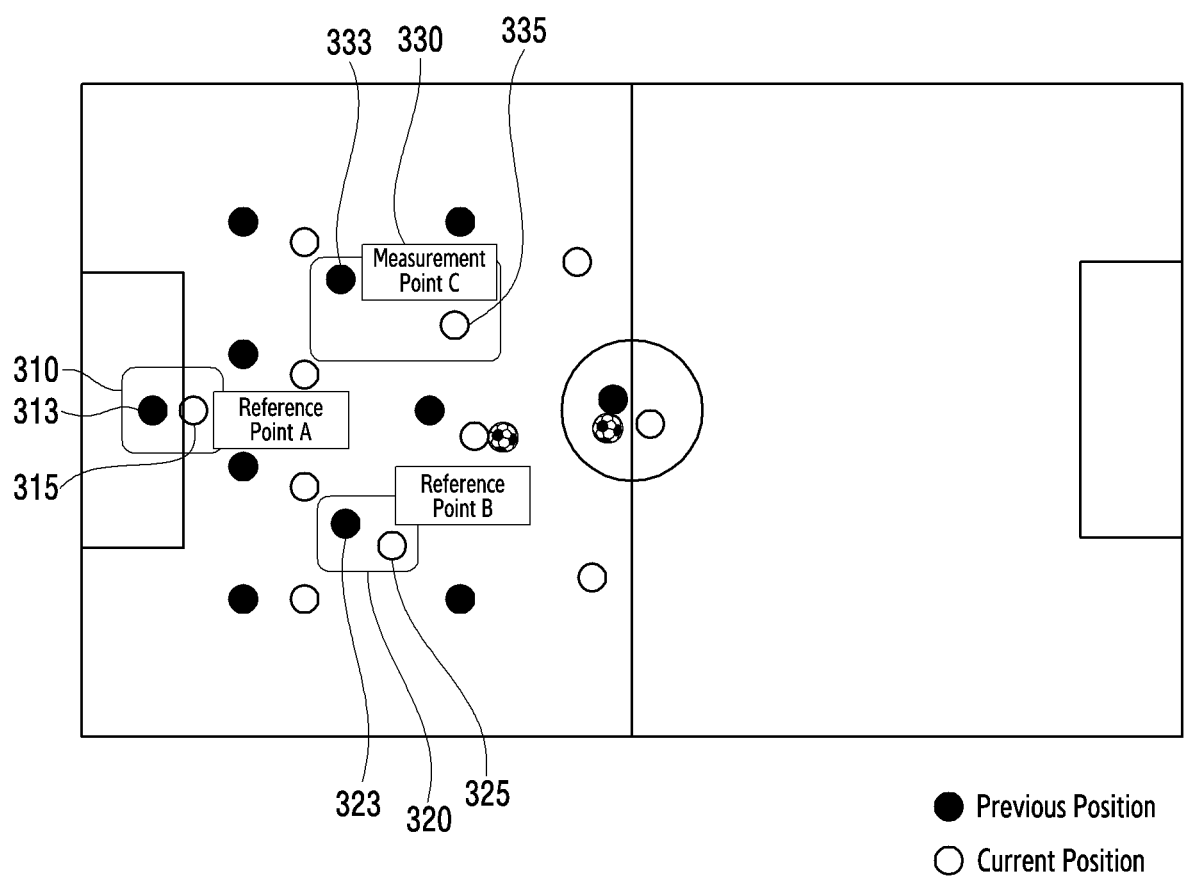
FIG. 3 is a diagram of a method for locating a position of an electronic device, according to an embodiment.

FIG. 3 is a diagram a method for locating a position of an electronic device, according to an embodiment.

Referring to FIG. 3, a position locating method of an electronic device may use a variable reference point without using a fixed reference point. The electronic device may be carried or worn by a user, and may generate movement information according to a movement (traveling) of the user. The method may locate a position more exactly as the reference point is fixed or an amount of movement is smaller. The position locating method of the electronic device may set electronic devices with the least amount of movement among the plurality of electronic devices to reference devices, and may allow the set reference devices to calculate distances to other electronic devices and to locate the positions of the electronic devices.

Two electronic devices with a small amount of movement may be set to reference devices, and positions of the electronic devices may be located by measuring distances between the reference distances and another electronic device by the triangulation. In FIG. 3, ● indicates positions of electronic devices at a previous measurement time, and ○ indicates positions of the electronic devices at a current measurement time. Reference numerals 313, 323, 333 indicate positions of electronic devices 310, 320, 330 at the previous measurement time, and reference numerals 315, 325, 335 indicate positions of the electronic devices 310, 320, 330 at the current measurement time. When positions of the electronic devices are located, a first reference point (reference point A) and a second reference point (reference point B) may be set first, distances from the first reference point and the second reference point to other electronic devices may be calculated second, and positions of the electronic devices may be calculated based on the calculated distances third.

In FIG. 3, the electronic device 310 may serve as the first reference device with the least amount of movement, the electronic device 320 may serve as the second reference device with the second least amount of movement, and the other electronic devices (e.g., the electronic device 330) may be normal electronic devices. The normal electronic devices may refer to all of the electronic devices except for the first reference device and the second reference device. The first reference device and the second reference device may calculate distances to the normal electronic device, respectively. Thereafter, a specific electronic device (e.g., the first reference device) may calculate coordinates of the normal electronic devices with reference to the positions of the first reference device and the second reference device, based on the triangulation.

FIG. 3 illustrates an example in which players in a soccer game wear the electronic devices. Various methods for tracking movements of players in a team sport such as soccer, basketball, or the like are being tried.

A real time location system (RTLS) is a system for determining positions and information of moving objects or things in a building or an open space with a limited range, such as a park, a playground, or the like, and is a positioning solution based on wireless communication technology such as UWB. The wireless communication method of the RTLS may use radio frequency identification (RFID), Bluetooth (BT), WiFi, UWB, GPS, or the like. Characteristics of each communication method may be as shown in Table 1 presented below:

TABLE 1

| Methods | WiFi | BT | UWB | GPS | Cell ID |
|---|---|---|---|---|---|
| Error range (accuracy) | 10 m | 10 m | 50 cm | 50 m | 50 m |
| Arrival distance (range) | 30 m | 20 m | 100 m | Tens of thousands of Km | 50 m |
| Current consumption | Tens of mA | Tens of mA | 20 mA | Hundreds of mA | Hundreds of mA |
| Battery life | A few days | A few days | One year | A few days | A few days |
| Positioning entity | AP | AP | device | satellite | Cell |
| Positioning technology | RSSI | beacon | TDOA | TDOA | RSSI |

In Table 1, the positioning entity refers to an entity which transmits a signal for locating a position, and the positioning technology may refer to a distance measurement method for a position of an electronic device. Time difference of arrival (TDOA) may be technology for one electronic device to obtain position information by using a difference in signal arrival time between two other electronic devices.

In Table 1, it can be seen that UWB has the best positioning characteristic in terms of the positioning error (accuracy) in comparison to the arrival distance (range). Since the UWB uses time stamp values of levels for distinguishing a few milli-seconds in a TODA positioning algorithm, the UWB has the excellent technical characteristic that positioning accuracy reaches tens of cm. The positioning technology using UWB may be applied to a high-precision positioning system having accuracy of tens of centimeters or less in indoor environments. A UWB signal continuously transmits a very short radio pulse, thereby occupying a broadband spectrum of a few GHz and having a very low power density.

The electronic device may measure RF arrival time between electronic devices based on UWB, may calculate distances between the electronic devices based on the measured RF arrival time, and may obtain angles of the electronic devices by the triangulation based on the measured distances between the electronic devices.

Figure 4:
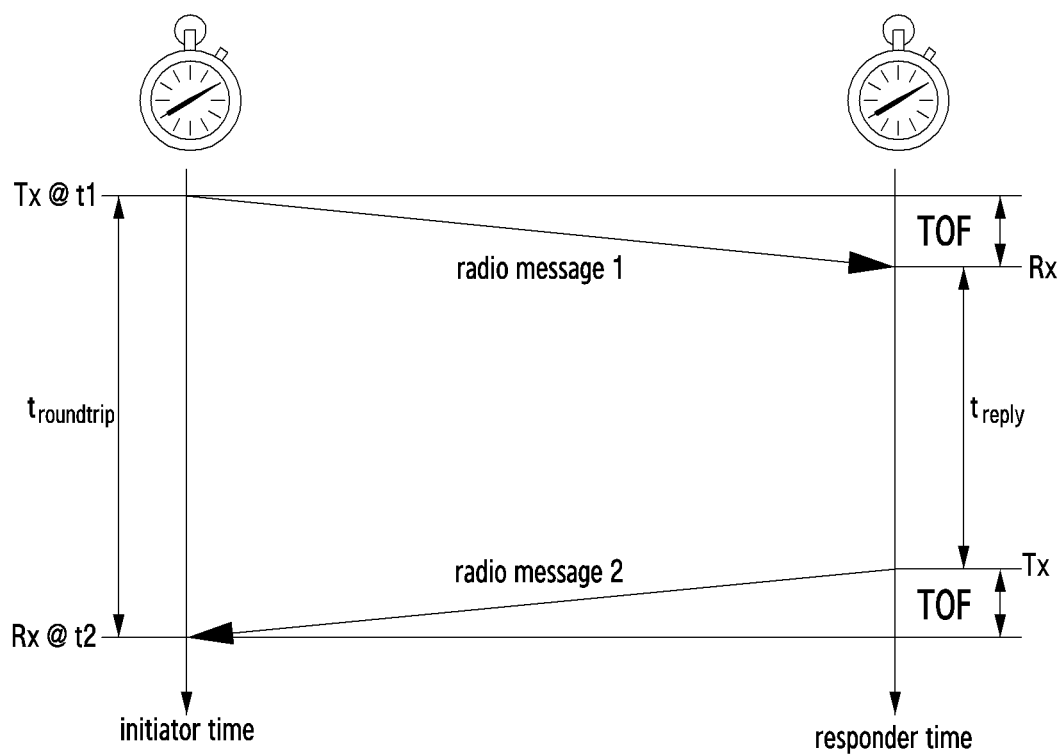
FIG. 4 is a diagram of a method for calculating distances between electronic devices based on a radio frequency (RF) arrival time in an electronic device, according to an embodiment.

FIG. 4 is a diagram a method for calculating distances between electronic devices based on RF arrival time in an electronic device, according to an embodiment.

Referring to FIG. 4, a first electronic device may transmit message 1 (radio message 1) to a second electronic device, and may receive message 2 (radio message 2) transmitted from the second electronic device. In this case, time of flight (TOF) may be calculated as shown in Equation (1) presented below:

$$TOF = \frac{t2 - t1 - treply}{2} \quad (1)$$

Figure 5:
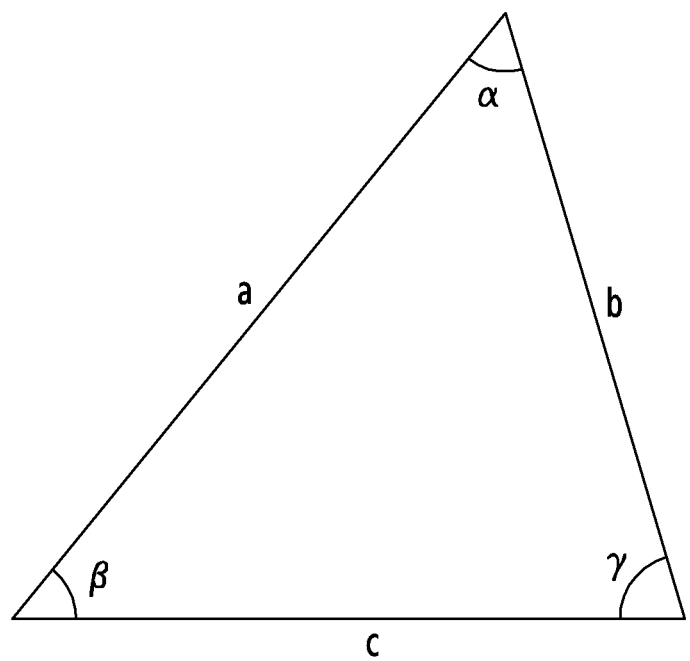
FIG. 5 is a diagram of a method for obtaining an angle of an electronic device, based on a measured distance by the electronic device, according to an embodiment.

FIG. 5 is a diagram of a method for obtaining an angle of an electronic device based on a measured distance by the electronic device, according to an embodiment.

Referring to FIG. 5, a first reference device may obtain an angle of an electronic device, based on distances among the first reference device, a second reference device, and normal electronic devices, as shown in Equation (2) presented below:

$$\cos \gamma = (b2 + c2 - a2)/2bc \quad (2)$$

A positioning system may include a plurality of electronic devices, and two electronic devices with a small amount of movement may become reference devices (electronic devices serving as reference points). Accordingly, each electronic device may become a reference device or a normal electronic device. The electronic devices may be set to a Tx device and an Rx device. An electronic device with the least amount of movement, determined through a sensor module (e.g., a six-axis acceleration sensor) among the electronic devices, may have its operation mode changed to a Tx electronic device as a software concept, and the other electronic devices may be changed to Rx electronic devices.

The electronic devices may measure distances between the electronic devices by using RF positioning of a UWB communication method. When positions of players are located by using electronic devices (wearable devices) in a team sport game of three or more players, an electronic device may measure distances between the electronic devices by using RF positioning technology such as UWB/WiFi, and may locate positions of the players indoors without a measurement reference device by using the triangulation. Exact position information of each player in indoor sports may be recorded, and various sport big data may be generated by using the recorded position information, and may be applied.

According to various embodiments, a positioning system may be provided with at least three electronic devices to locate a position of an electronic device. Each electronic device may include a sensor module configured to track a movement of the electronic device, a communication module configured to communicate with other electronic devices, a memory, and at least one processor operatively connected with the sensor module, the communication module, and the memory, and configured, based on instructions stored in the memory, to set the electronic device to a master electronic device, a first reference device, a second reference device, or a normal electronic device, respectively. The processor of the master electronic device may receive movement information of the electronic devices, and may set the electronic devices to the first reference device, the second reference device, or the normal electronic device, respectively, based on the movement information. The processor of the first reference device may calculate a distance between the first reference device and the second reference device and a distance between the first reference device and the normal electronic device, may receive distance information between the second reference device and the normal electronic device, and may calculate positions of the normal electronic devices by a triangulation method, based on the distance information among the first reference device, the second reference device, and the normal electronic device. The processor of the second reference device may calculate a distance between the second reference device and the normal electronic device, and may transmit the calculated distance information to the first reference device.

The processor of the first reference device may transmit the calculated position information of the normal electronic devices to a server, and may be converted into the master electronic device.

The processor of the master electronic device may request the normal electronic devices to track movements, may generate a resulting message table based on the movement information received from the electronic devices and a movement of the master electronic device and may transmit the resulting message table to the electronic devices, and may set electronic devices with the small amount of movement to the first reference device and the second reference device based on the movement information.

The processors of the normal electronic devices may track movements of the electronic devices detected via the sensor modules when the master electronic device requests tracking of movements, and may transmit the movement information to the master electronic device.

The sensor module may include an acceleration sensor.

The processor of the first reference device may measure the distance between the first reference device and the second reference device and the distance between the first reference device and the normal electronic device through an RF positioning module, may receive the distance information between the second reference device and the normal electronic device from the second reference device, and may calculate the position of the normal electronic device by the triangulation method, based on the distances among the first reference device, the second reference device, and the normal electronic device.

The RF positioning module may be a UWB communication module, and the processor of the first reference device may calculate the distance between the first reference device and the second reference device and the distance between the first reference device and the normal electronic device, based on an RF arrival time of the UWB communication module.

According to various embodiments, a positioning system of electronic devices may include a master electronic device configured to receive movement information of the electronic devices, and to set the electronic devices to a first reference device, a second reference device, or a normal electronic device, respectively, based on the movement information, the first reference device configured to calculate a distance between the first reference device and the second reference device and a distance between the first reference device and the normal electronic device, to receive distance information between the second reference device and the normal electronic device, and to calculate a position of the normal electronic device by a triangulation method, based on the distance information among the first reference device, the second reference device, and the normal electronic device, the second reference device configured to calculate a distance between the second reference device and the normal electronic device, and to transmit the calculated distance information to the first reference device, and at least one normal electronic device configured to transmit a message for calculating distances to the reference devices to the first reference device and the second reference device.

The positioning system may further include a server, and the first reference device may transmit refined position information of the electronic devices to the server, and may be converted into the master electronic device.

The master electronic device may transmit a message for requesting tracking of a movement to the electronic devices, may receive a movement tracking message including identification information of the electronic devices and the measured movement information, may generate a movement tracking message table based on the movement tracking message and may transmit the movement tracking message table to the electronic devices, and may set the electronic devices to the first reference device, the second reference device, or the normal electronic device, respectively, based on the movement information.

The first reference device may measure the distance between the first reference device and the second reference device and the distance between the first reference device and the normal electronic device through an RF positioning module, may receive the distance information between the second reference device and the normal electronic device from the second reference device, and may calculate the position of the normal electronic device by the triangulation method, based on the distances among the first reference device, the second reference device, and the normal electronic device.

The RF positioning module may be a UWB communication module, and the first reference device may calculate the distance between the first reference device and the second reference device and the distance between the first reference device and the normal electronic device, based on an RF arrival time of the UWB communication module.

Figure 6:
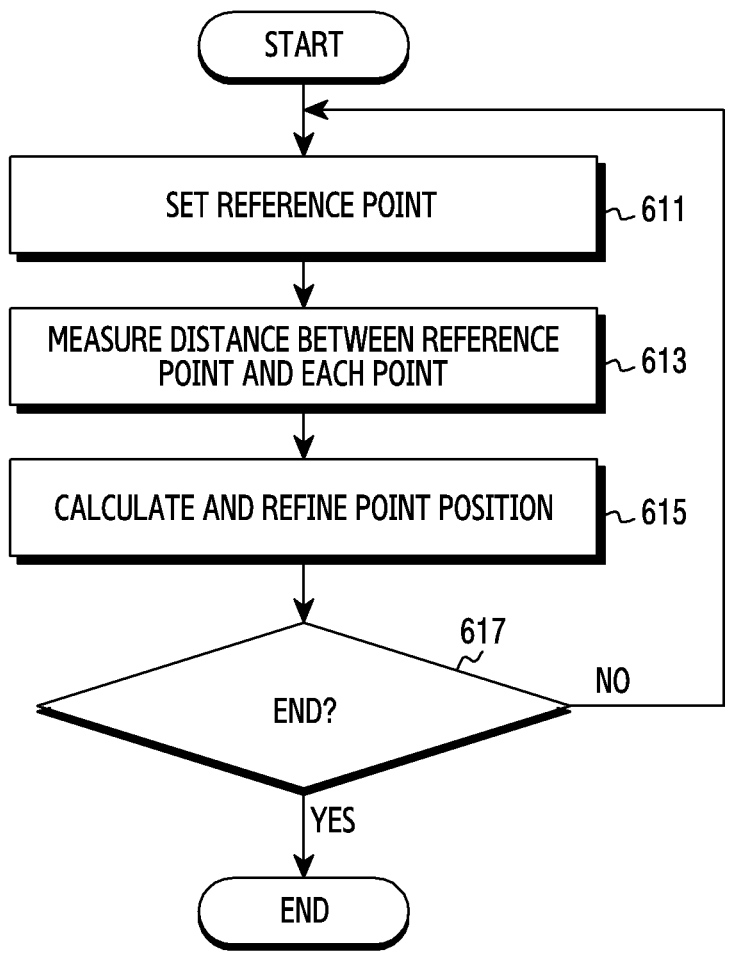
FIG. 6 is a flowchart of a position locating operation of an electronic device, according to an embodiment.

FIG. 6 is a flowchart of a position locating operation of an electronic device, according to an embodiment. In FIG. 6, "reference points" may be positions of a first reference device and a second reference device, and "points" may be positions of normal electronic devices.

Referring to FIG. 6, a master electronic device may request movement information from a plurality of electronic devices (three or more electronic devices) in operation 611. When movement information is requested, the electronic devices track their movements and may transmit the results of tracking to the master electronic device. The master electronic device may set reference devices for locating positions of the electronic devices, based on the received movement information of the electronic devices. The electronic devices may measure their own movement indexes at a position locating time, and the master electronic device may set an electronic device with the least amount of movement and an electronic device with the second least amount of movement to first and second reference devices, respectively, based on the measured movement indexes, and may set the other electronic devices to normal electronic devices. The normal electronic devices may be electronic devices with an amount of movement larger than those of the first reference device and the second reference device in the positioning system, and may be all electronic devices in the positioning system except for the first reference device and the second reference device.

The first and second reference devices may calculate distances between the reference devices and the normal electronic devices (distances between the reference points and the points) in operation 613. The distances may be calculated by an RF positioning method. An electronic device may calculate distances between the electronic devices based on TDOA by UWB or RSSI by WiFi. The first reference device may calculate a distance between the first reference device (first reference point) and the second reference device (second reference point), and may calculate distances between the first reference device (first reference point) and the normal electronic device (point) by UWB communication. For example, the second reference device may calculate distances between the second reference device (second reference point) except for the first reference device and the normal electronic device (points) by UWB communication. The second reference device may transmit the calculated distance value with the normal electronic device (the distance between the second reference point and the point) to the first reference device.

The first reference device may calculate a position of the electronic device based on the distances between the reference devices and the normal electronic device in operation 615. The first reference device may calculate the position (coordinates) of the normal electronic device by the triangulation method, based on the distance between the first reference device and the second reference device, the distance between the first reference device and the normal electronic device, and the distance between the second reference device and the normal electronic device. After calculating the positions of the electronic devices, the first reference device may transmit refined position information to a server.

The first reference device may determine whether the position locating of the electronic devices is ended in operation 617. If the position locating of the electronic devices is ended, the first reference device may finish the position locating procedure. If the position locating of the electronic devices is not ended, the first reference device may return in the operation 611, and be converted into a master electronic device. The master electronic device may perform a function of setting a reference device based on movements of the electronic devices at the next position locating time.

Figure 7:
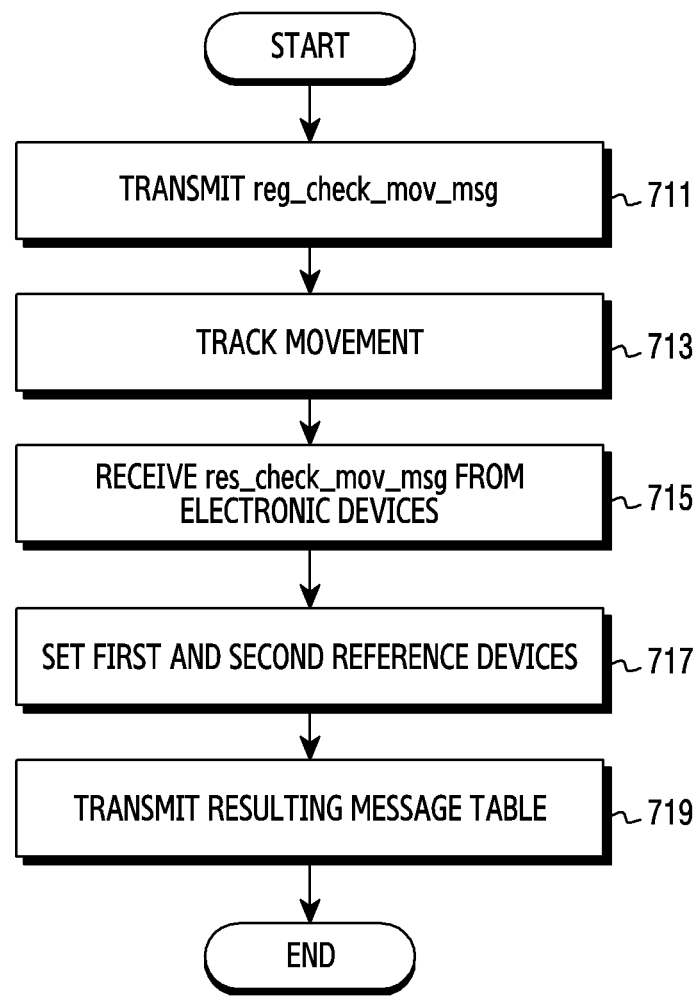
FIG. 7 is a flowchart of an operation of setting a reference device by a master electronic device, according to an embodiment.

FIG. 7 is a flowchart of an operation of setting a reference device by a master electronic device, according to an embodiment. FIG. 7 may illustrate the operation of the master electronic device at operation 611 of FIG. 6. The master electronic device may be the first reference device at the previous locating time.

Referring to FIG. 7, the master electronic device may transmit a first message (for example, req_check_mov_msg) for requesting tracking of movements to all electronic devices in operation 711. The message req_check_mov_msg (request check movement message) may be a message for requesting all electronic devices to transmit movement tracking messages including their own movement indexes. The master electronic device may measure its own movement index in operation 713. The movement index may be measured by a sensor module. The sensor module may be an acceleration sensor. The electronic device may track a user's movement for a set time in operation 713. The electronic device may be a wearable device, and may be worn on user's ankle, thigh, wrist, arm, etc. When the electronic device is worn on user's wrist, the master electronic device may track the user's movement for the set time based on an equation (the number of times of waving arms*1 average step length). When the user moves outdoors, the master electronic device may calculate a user's movement index based on GPS positioning.

The master electronic device may receive, from the electronic devices, a second message (e.g., res_check_mov_msg) which is a response message to the first message in operation 715. The message res_check_mov_msg (response check movement message) may be a movement tracking message including the movement index measured at each electronic device. The message res_check_mov_msg may be a message including data of an ID, a time stamp, a movement index (which may include GPS positioning information) of a corresponding electronic device. When the messages res_check_mov_msg are received from the electronic devices, the master electronic device may analyze the messages res_check_mov_msg and its own movement index, and may set an electronic device with the least amount of movement to a first reference device and may set an electronic device with the second least amount of movement to a second reference device, and may set the other electronic devices to normal electronic devices in operation 717. In operation 719, the master electronic device may generate a movement resulting table (e.g., result_msg_table) of the reference devices and the electronic devices based on all received messages res_check_mov_msg, and may transmit the generated table result_msg_table to each electronic device. The table result_msg_table (result check movement message table) may include information of the first reference device and the second reference device, and may be information of data of a sequence number, a time stamp, a movement index (including GPS positioning) of each electronic device arranged in the form of a table. The master electronic device may not designate the first reference device and the second reference device, and may only transmit the table result_msg_table.

Figure 8:
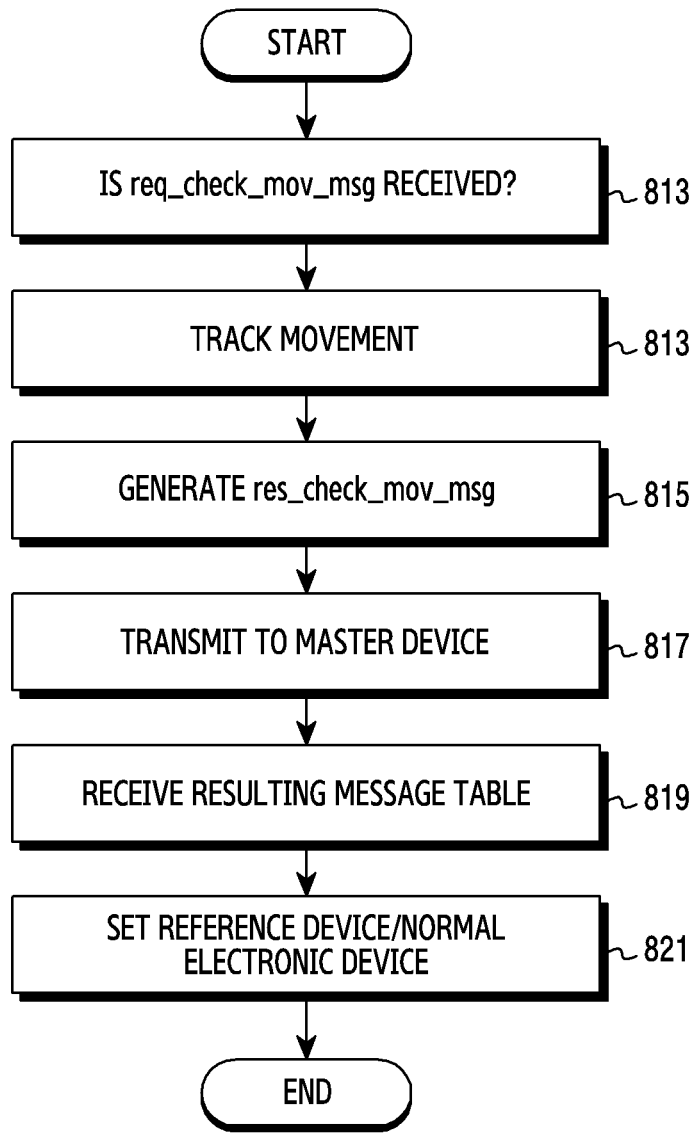
FIG. 8 is a flowchart of an operation of a normal electronic device when a reference device is set, according to an embodiment.

FIG. 8 is a flowchart of an operation of a normal electronic device when a reference device is set, according to an embodiment. FIG. 8 may illustrate the operation of the normal electronic device in operation 611 of FIG. 6.

Referring to FIG. 8, a normal electronic device may receive a first message (e.g., req_check_mov_msg) transmitted from a master electronic device in operation 811. The message req_check_mov_msg (request check movement message) may be a message that is transmitted when a reference device is set at the master electronic device. When the message req_check_mov_msg is received, the normal electronic device may measure its own movement index in operation 813. The movement index may be measured by a sensor module. The sensor module may be an acceleration sensor. The electronic device may be a wearable device. When the electronic device is worn on user's wrist, the normal electronic device may track a user's movement for a reference time based on an equation (the number of times of waving arms*1 average step length). When the user moves outdoors, the master electronic device may calculate a user's movement index based on GPS positioning.

In operation 815, the normal electronic device may generate a second message (e.g., res_check_mov_msg). The message res_check_mov_msg may be a message including the movement index measured at the corresponding electronic device. The message res_check_mov_msg may be a message including data of an ID, a time stamp, and a movement index (which may include GPS positioning information) of the corresponding electronic device. The normal electronic device may transmit the generated message res_check_mov_msg to the master electronic device in operation 817.

The normal electronic device may receive, from the master electronic device, a movement resulting table (e.g., result_msg_table) of a reference device and electronic devices in operation 819. The table result_msg_table (result check movement message table) may include information of a first reference device and a second reference device, and may be information of data of a sequence number, a time stamp, a movement index (including GPS positioning) of each electronic device arranged in the form of a table. In operation 821, the normal electronic device may set itself to the first reference device, the second reference device, or the normal electronic device, based on the received table result_msg_table. The electronic device designated as the first reference device in the table result_msge_table may be set to the first reference device, the electronic device designated as the second reference device may be set to the second reference device, and the other electronic devices may be set to the normal electronic devices. When the first reference device and the second reference device are not designated at the master electronic device, the normal electronic devices may analyze the movement indexes of the electronic devices included in the table result_msg_table. An electronic device with the least amount of movement may set itself to the first reference device, an electronic device with the second least amount of movement may set itself to the second reference device, and the other electronic devices may set themselves to normal electronic devices.

Figure 9:
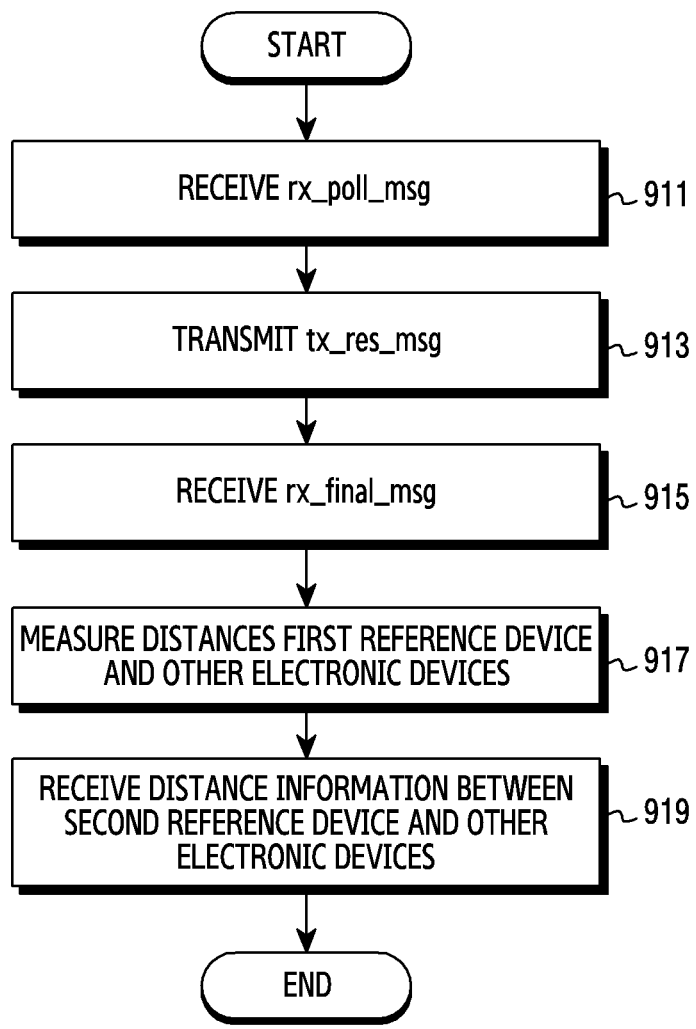
FIG. 9 is a flowchart of an operation of a first reference device, according to an embodiment.

FIG. 9 is a flowchart of an operation of a first reference device, according to an embodiment.

Referring to FIG. 9, a second reference device and normal electronic devices may identify the first reference device based on information of a movement resulting table (e.g., result_msg_table) of reference devices and electronic devices. The first reference device may communicate messages with the second reference device and all electronic devices through a communication module. The communication module may be a UWB communication module. The second reference device and the normal electronic devices may transmit a third message (e.g., rx_poll_msg) to the first reference device, such that the first reference device can calculate distances between the first reference device and the other electronic devices (the second reference device and the normal electronic devices). The first reference device may receive the message rx_poll_msg from the second reference device and the normal electronic devices in operation 911. The message rx_poll_msg may be a message for requesting the first reference device to transmit a fourth message (e.g., tx_res_msg (tx response message)). When the message rx_poll_msg is received, the first reference device may transmit the message tx_res_meg to the corresponding electronic device in operation 913. The message tx_res_msg may be a message including an ID/time stamp. After transmitting the message tx_res_msg, the first reference device may receive a fifth message (e.g., rx_final_msg) from the corresponding second electronic device or the normal electronic device in operation 915.

When the message rx_final_msg is received from the second reference device and all normal electronic devices, the first reference device may calculate a distance between the first reference device and the second reference device or a distance between the first reference device and a corresponding normal electronic device in operation 917. The method for calculating the distances between the first reference device and the other electronic devices (e.g., the second reference device, the normal electronic devices) may be performed as shown in FIG. 4. The first reference device may receive distance information between the second reference device and the normal electronic device from the second reference device in operation 919.

Figure 10:
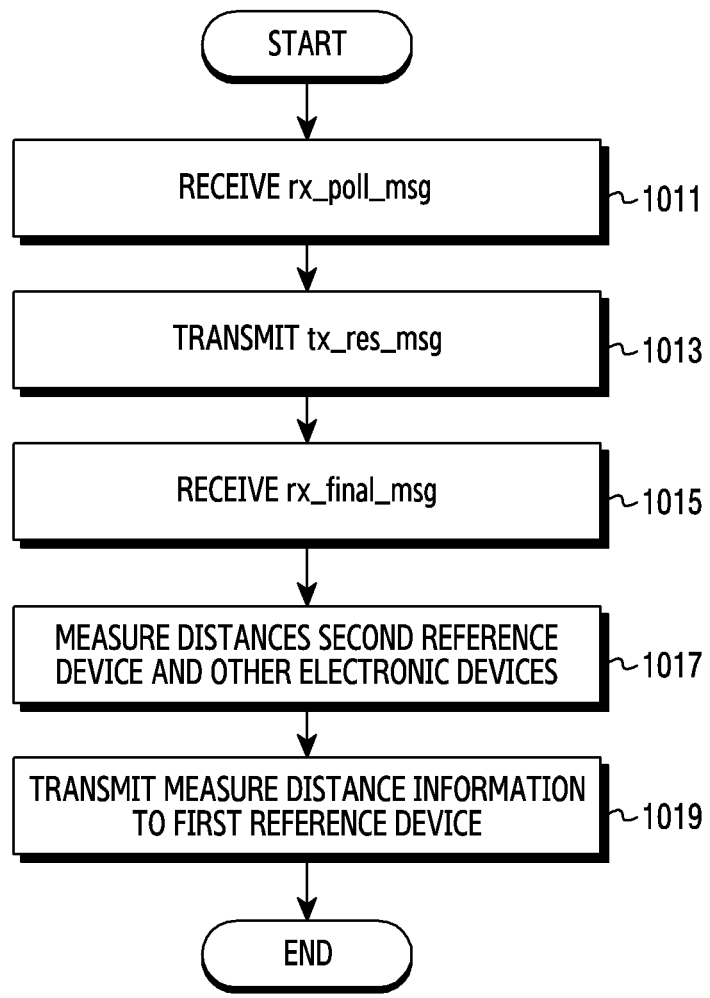
FIG. 10 is a flowchart of an operation of a second reference device, according to an embodiment.

FIG. 10 is a flowchart of an operation of a second reference device, according to an embodiment.

Referring to FIG. 10, normal electronic devices may identify the second reference device based on information of a movement resulting table (e.g., result_msg_table) of reference devices and electronic devices. The second reference device may communicate messages with a first reference device and all normal electronic devices through a communication module. The communication module may be a UWB communication module. The normal electronic devices may transmit a third message (e.g., rx_poll_msg) to the second reference device, such that the second reference device can calculate distances between the second reference device and the normal electronic devices. The second reference device may transmit the message rx_poll_msg to the first reference device. This is for the first reference device to calculate a distance between the first reference device and the second reference device. The second reference device may receive the message rx_poll_msg from the electronic devices in operation 1011. The message rx_poll_msg may be a message of the normal electronic device for requesting the second reference device to transmit a fourth message (e.g., tx_res_msg (tx response message)). When the message rx_poll_msg is received, the second reference device may transmit the message tx_res_meg to the corresponding electronic device in operation 1013. The message tx_res_msg may be a message including an ID/time stamp. After transmitting the message tx_res_msg, the second reference device may receive a fifth message (e.g., rx_final_msg) from the corresponding normal electronic device in operation 1015.

When the messages rx_final_msg are received from all of the normal electronic devices, the second reference device may calculate a distance between the second reference device and the corresponding normal electronic device in operation 1017. The method for calculating the distances between the second reference device and the normal electronic device may be performed as shown in FIG. 4. The second reference device may transmit the distance information between the second reference device and the normal electronic device to the first reference device in operation 1019.

Figure 11:
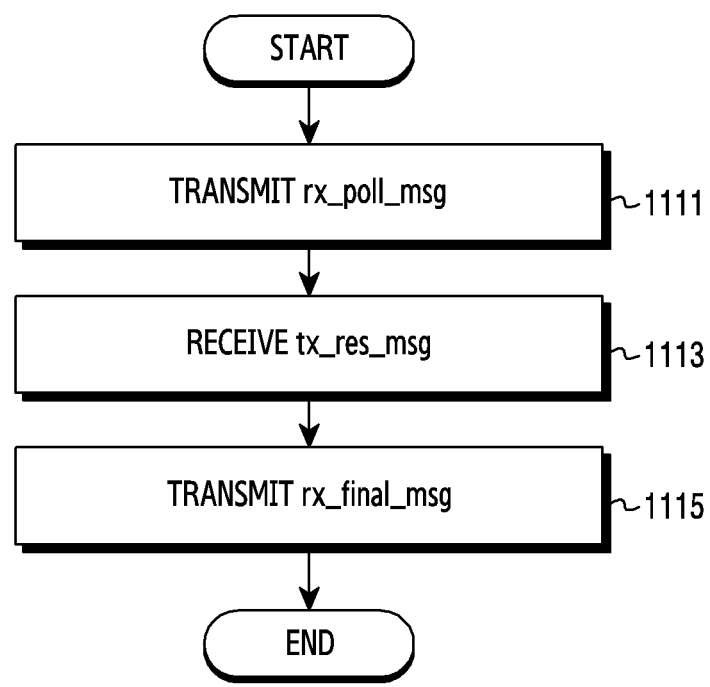
FIG. 11 is a flowchart of an operation of a normal electronic device, according to an embodiment.

FIG. 11 is a flowchart of an operation of a normal electronic device, according to an embodiment.

Referring to FIG. 11, normal electronic devices may identify a first reference device and a second reference device based on information of a movement resulting table (e.g., result_msg_table) of reference devices and electronic devices. The normal electronic device may communicate messages with the first reference device and the second reference device through a communication module. The communication module may be a UWB communication module. The normal electronic device may transmit a third message (e.g., rx_poll_msg) to the first reference device and the second reference in operation 1111. The normal electronic device may receive a fourth message (e.g., tx_res_msg) transmitted from the first reference device and the second reference device. When the message tx_res_msg is received, the normal electronic device may transmit a fifth message (e.g., rx_final_msg) to the first reference device and the second reference device in operation 1115.

Figure 12:
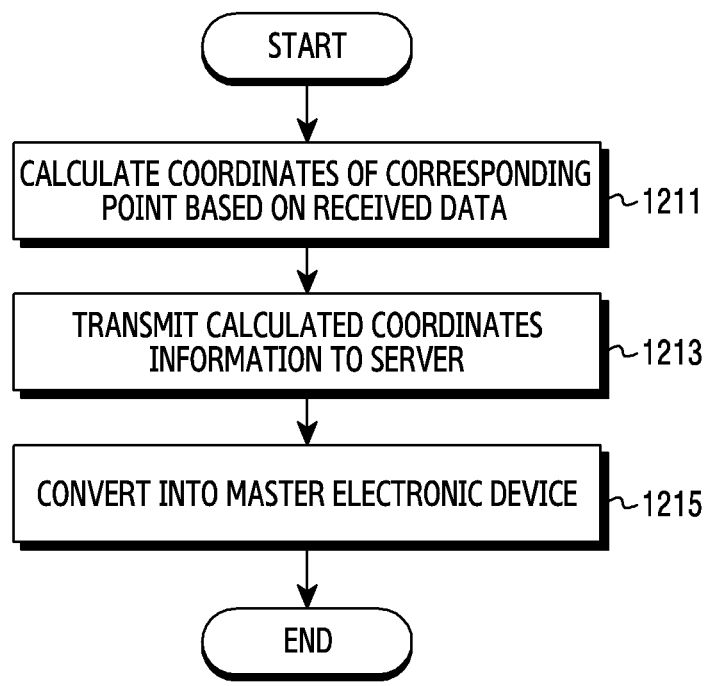
FIG. 12 is a flowchart of an operation of locating a position of an electronic device by a first reference device, according to an embodiment.

FIG. 12 is a flowchart of an operation of locating a position of an electronic device by a first reference device, according to an embodiment.

Referring to FIG. 12, the first reference device may calculate a distance between the first reference device and a second reference device, and distances between the first reference device and normal electronic devices. In addition, the first reference device may receive, from the second reference device, distance information between the second reference device and the normal electronic device. The first reference device may identify distances between vertexes of the triangle formed by the first reference device, the second reference device, and the normal electronic device as shown in FIG. 5. The first reference device may calculate a position (coordinates) of the normal electronic device based on the triangulation according to the distances among the first reference device, the second reference device, and the normal electronic device in operation 1211. The first reference device may transmit the calculated coordinate information of the electronic device to a server in operation 1213. The first reference device may be converted into a master electronic device in operation 1215. The converted master electronic device may analyze movement indexes of all electronic devices registered at the next measurement time, and may perform a function of designating a first reference device and a second reference device.

Figure 13:
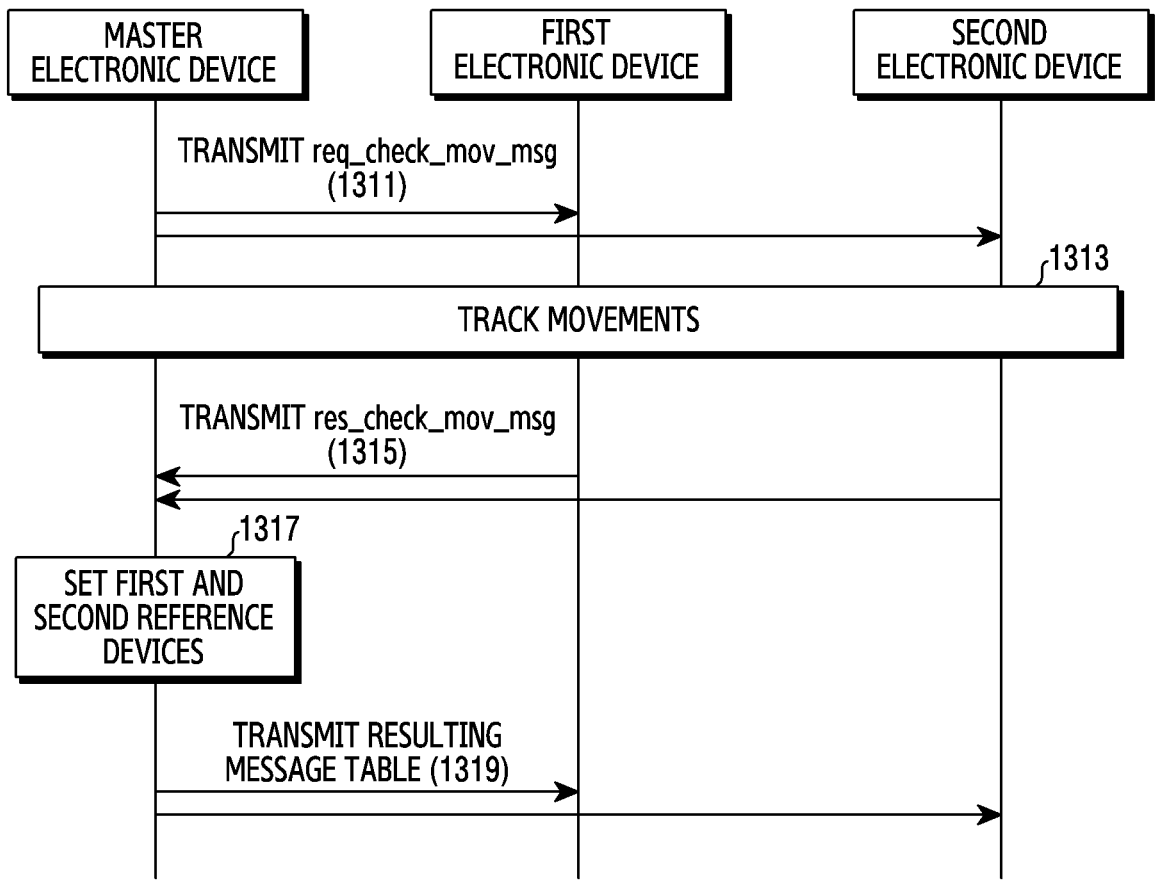
FIG. 13 is a diagram of a procedure of setting a reference point in a positioning system of an electronic device, according to an embodiment.

FIG. 13 is a diagram of a procedure for setting a reference point in a positioning system of an electronic device, according to van embodiment. FIG. 13 illustrates an example of a positioning system including a master electronic device and two normal electronic devices. The master electronic device and the normal electronic devices may be wearable devices that can be worn by users.

Referring to FIG. 13, the master electronic device may analyze movements of the normal electronic devices, and may set a reference point for locating positions of the electronic devices. The master electronic device may set a position of an electronic device with the least amount of movement (first electronic device) among the normal electronic devices to a first reference point, and may set a position of an electronic device with the second least amount of movement (second reference device) to a second reference point.

In operation 1311, the master electronic device may transmit a first message (e.g., req_check_mov_msg) to the first normal electronic device and the second normal electronic device. The master electronic device and the first normal electronic device and the second normal electronic device which receive the message req_check_mov_msg may measure their own movement indexes in operation 1313. The movement index may be measured by a sensor module. The sensor module may be an acceleration sensor. The first normal electronic device and the second normal electronic device may generate second messages (e.g., res_check_mov_msg) including the measured movement indexes, and may transmit the second messages to the master electronic device in operation 1315. The message res_check_mov_msg may include an ID, a time stamp, and the measured movement index of a corresponding electronic device. In addition, when GPS information is obtainable, the normal electronic device may include the obtained GPS information and may transmit the same.

The master electronic device may analyze the received messages res_check_mov_msg of the normal electronic devices, and movement index values measured by itself, and may select electronic devices with the small amount of movement and may designate the selected electronic devices as reference devices. For example, the master electronic device may designate an electronic device with the least amount of movement as a first reference device, may designate an electronic device with the second least amount of movement as a second reference device, and may designate the other electronic devices as normal electronic devices. The master electronic device may generate a message table (e.g., result_msg_table) including IDs, time stamps, and movement indexes of the respective devices, and may transmit the generated table to the first normal electronic device and the second normal electronic device in operation 1319. The master electronic device may include information regarding the first reference device and the second reference device in the table result_msg_table, and may transmit the table result_msg_table.

Figure 14:
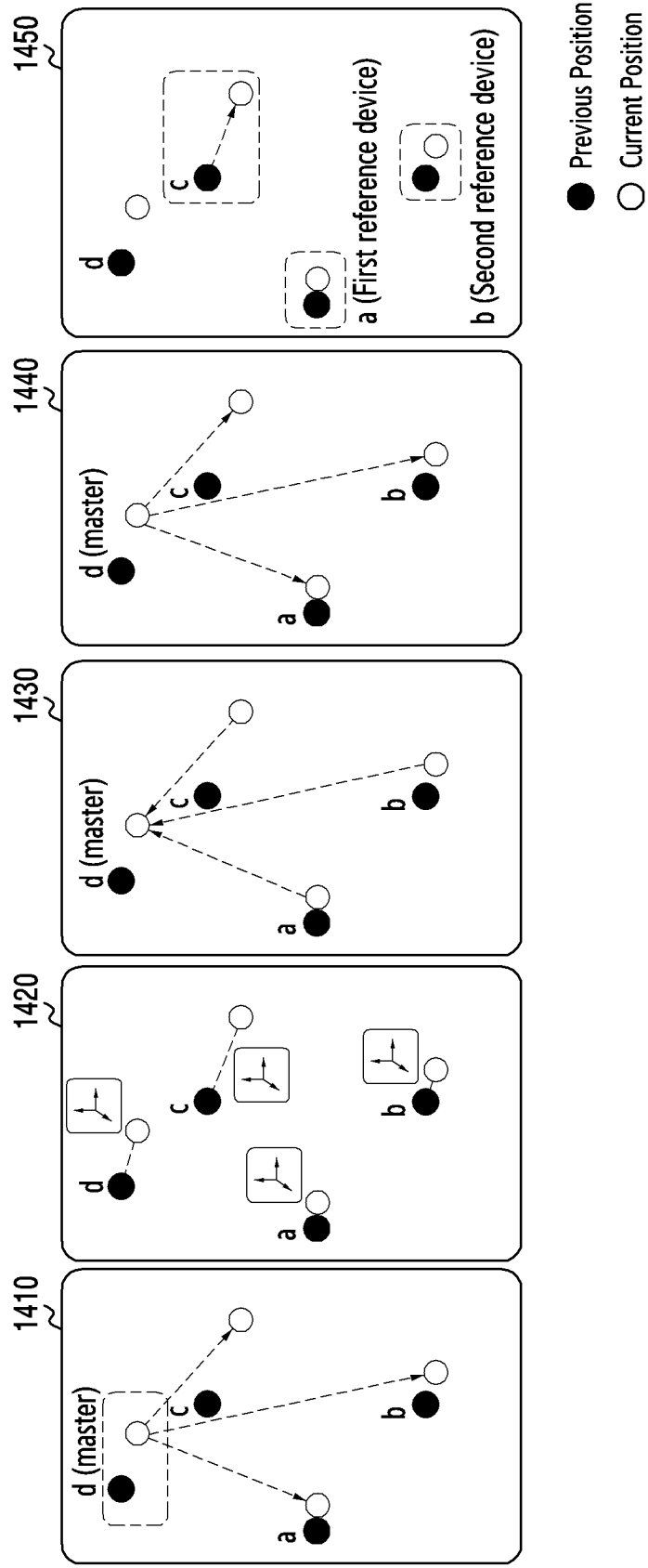
FIG. 14 is a diagram of an example of setting a first reference device and a second reference device by a master electronic device, according to an embodiment.

FIG. 14 is a diagram of an example of setting a first reference device and a second reference device by a master electronic device, according to an embodiment. In FIG. 14, d indicates a master electronic device and a-c indicate normal electronic devices. In FIG. 14, ● indicates previous positions of electronic devices and ○ indicates current positions of the electronic devices.

Referring to FIG. 14, at a time of locating a position of an electronic device (current time), the master electronic device d may transmit a first message (e.g., req_check_mov_msg) to the normal electronic devices a-c as indicated by reference numeral 1410. The master electronic device d and the normal electronic devices a-c which receive the message req_check_mov_msg may track their respective movements as indicated by reference numeral 1420. The normal electronic devices a-c tracking the movements may generate second messages (e.g., res_check_mov_msg) including movement indexes, and may transmit the second messages to the master electronic device as indicated by reference numeral 1430. The master electronic device receiving the messages res_check_mov_msg of the normal electronic devices a-c may generate a message table (e.g., result_msg_table) based on the messages res_check_mov_msg of the normal electronic devices and a message including its own movement index, and may transmit the table result_msg_table to the normal electronic devices a-c as indicated by reference numeral 1440. The master electronic device may analyze the messages res_check_mov_msg, and may set electronic devices with small amounts of movement to reference devices, and may inform the normal electronic devices a-c of the set reference devices as indicated by reference numeral 1450. Reference numeral 1450 of FIG. 14 indicates an example in which the first reference device with the least amount of movement is the electronic device a, and the second reference device with the second least amount of movement is the electronic device b. The positioning system may set a position of the first reference device a as a first reference point, and may set a position of the second reference device b as a second reference point, and the first reference device may locate the position of the electronic device based on the first reference point, the second reference point, and the position point of the normal electronic device.

Figure 15:
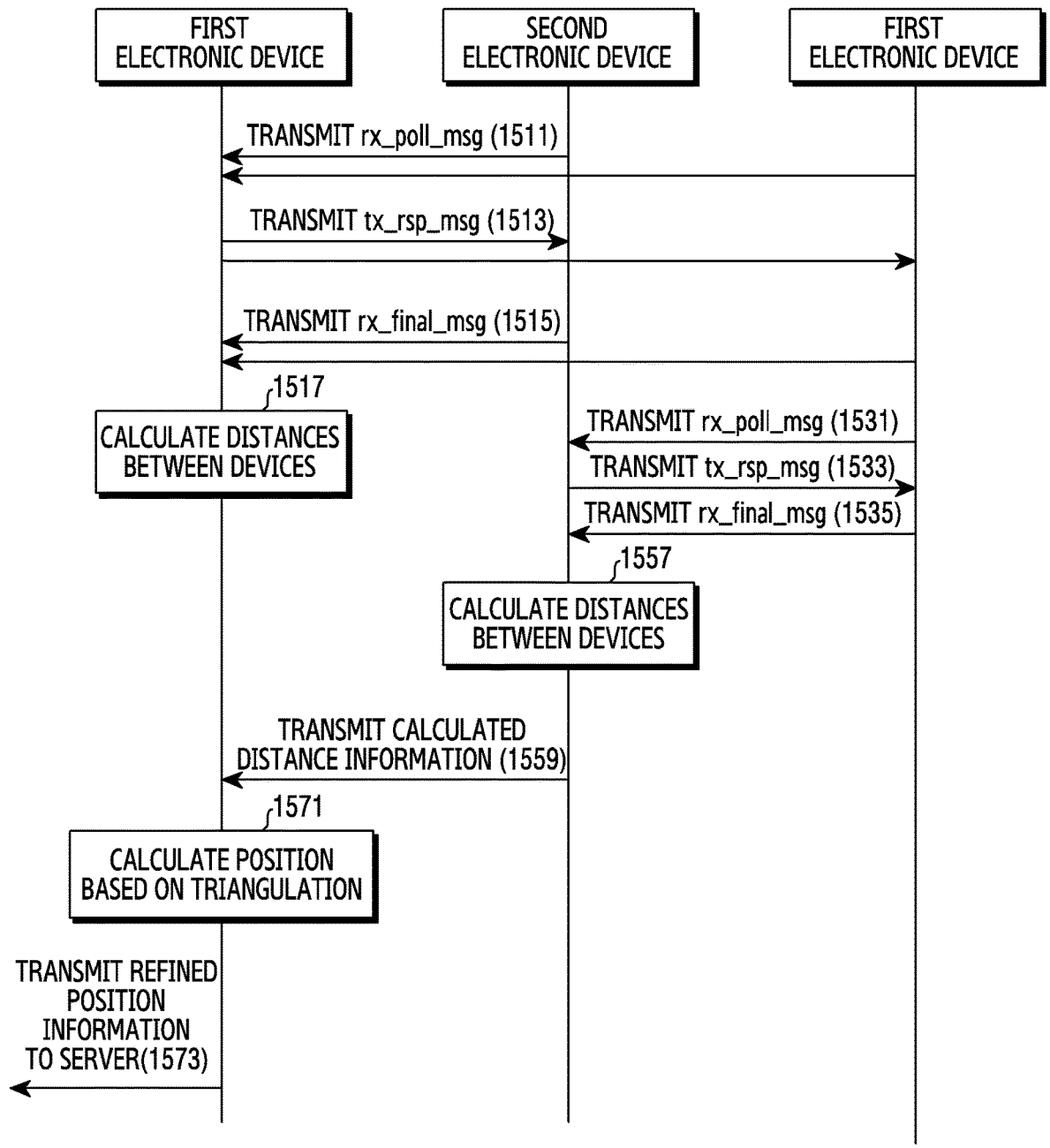
FIG. 15 is a flowchart of a method for measuring distances between electronic devices in a positioning system of an electronic device, according to an embodiment.

FIG. 15 is a flowchart of a method for measuring distances between electronic devices in a positioning system of an electronic device, according to an embodiment. FIG. 15 illustrates an example of a positioning system including a first reference device, a second reference device, and a normal electronic device. The first and second reference devices and the normal electronic device may be wearable devices which can be worn by users.

Referring to FIG. 15, the second reference device and the normal electronic device may transmit a third message (e.g., rx_poll_msg) to the first reference device in operation 1511. The first reference device receiving the message rx_poll_msg may transmit a fourth message (e.g., tx_res_msg) to the second reference device and the normal electronic device in operation 1513. The message tx_res_msg may include an ID and a time stamp. The second reference device and the normal electronic device which receive the message tx_res_msg may transmit a fifth message (e.g., rx_final_msg) to the first reference device in operation 1515. The first reference device which receives the message rx_final_msg may calculate distances between the first reference device and the second reference device and the normal electronic device transmitting the message rx_final_msg. The method for calculating distances by the first reference device may be performed as shown in FIG. 4. A positioning method using UWB may be more exact than a GPS positioning method. For example, when a sum of error values of two positioning reference points (first reference point and second reference point) falls within 17 m, positioning may be more exactly performed than in the case of an average GPS error.

Communication among the first reference device, the second reference device, and the normal electronic device may be performed by communication modules. The communication module may use an RF positioning module (e.g., a UWB communication module (TDOA positioning module) or WiFi communication module (RSSI positioning module)). Each electronic device in the positioning system of the electronic device may use a UWB communication module which is excellent in terms of the positioning error (accuracy) in comparison to the arrival distance (range) as shown in Table 1. The electronic devices may communicate the messages rx_poll_msg, tx_res_msg, and rx_final_msg through the UWB communication module.

The normal electronic device may transmit the message rx_poll_msg to the second reference device in operation 1531. The second reference device which receives the message rx_poll_msg may transmit the message tx_res_msg to the normal electronic device in operation 1533. The message tx_res_msg may include an ID and a time stamp. The normal electronic device which receives the message tx_res_msg may transmit the message rx_final_msg to the second reference device in operation 1535. The second reference device which receives the message rx_final_msg may calculate a distance between the second reference device and the normal electronic device in operation 1557. The method for calculating the distance may be performed as shown in FIG. 4. The second reference device may transmit the calculated distance information (e.g., distance information between the second reference device and the normal electronic device) to the first reference device in operation 1559.

In the operations of calculating the distances between the reference devices and the electronic device in FIG. 15, the first reference device calculates the distance and then the second reference device calculates the distance. However, the first reference device and the second reference device may calculate the distances between the respective reference devices and the electronic device at the same time.

The first reference device may identify the distance between the first reference device and the second reference device, the distance between the first reference device and the normal electronic device, and the distance between the second reference device and the normal electronic device, based on the distance information calculated in operation 1517 and the distance information received in operation 1559. The first reference device may calculate the angle (or position) of the electronic device in the calculation method as in FIG. 5 by the triangulation, based on the distances between the electronic devices in operation 1571.

The first reference device may transmit the calculated (refined or updated) position information of the electronic device to a server in operation 1573.

Figure 16A:
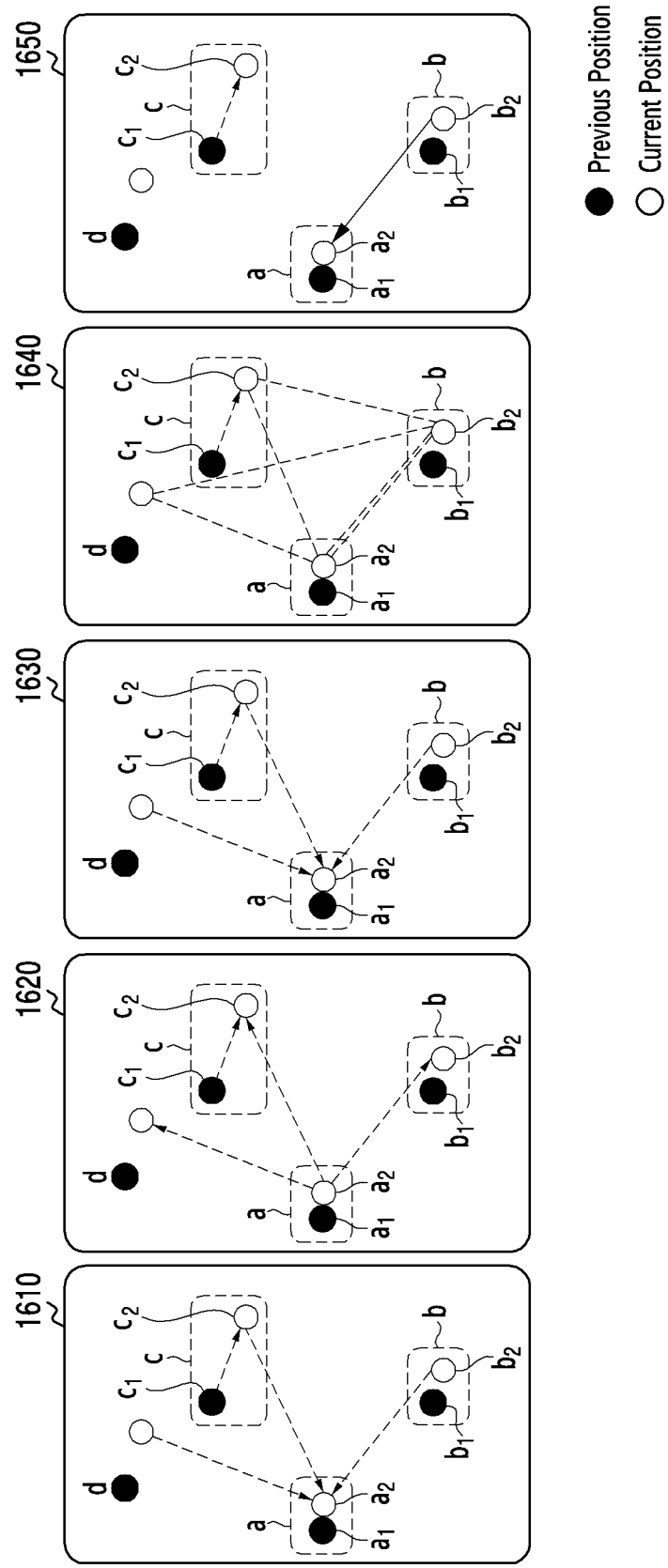
FIGS. 16A and 16B are diagrams of an example of locating a position by calculating distances between electronic devices by a first reference device, according to an embodiment.
Figure 16B:
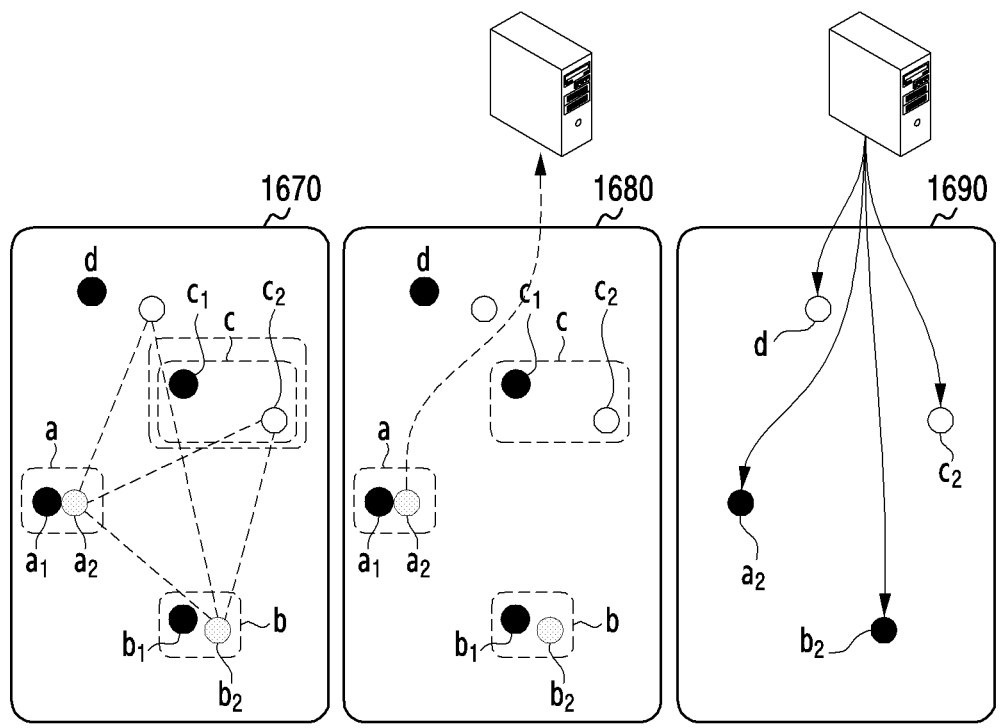

FIGS. 16A and 16B are diagrams of an example of locating a position by calculating a distance between electronic devices by a first reference device, according to an embodiment. In FIGS. 16A and 16B, d indicates a master electronic device and a-c indicate normal electronic devices. In FIGS. 16A and 16B, ● indicates previous positions of electronic devices and ○ indicates current positions of the electronic device. In FIGS. 16A and 16B, a may indicate a first reference device, b may indicate a second reference device, and c may indicate a normal electronic device.

FIG. 16A illustrates a method for calculating distances to an electronic device by the first reference device and the second reference device, respectively.

The second reference device b and the normal electronic device c may transmit a third message (e.g., rx_poll_msg) to the first reference device a as indicated by reference numeral 1610. The first reference device a which receives the message rx_poll_msg may transmit a fourth message (e.g., tx_res_msg) to the second reference device b and the normal electronic device c as indicated by reference numeral 1620. The second reference device b and the normal electronic device c which receive the message tx_res_msg may transmit a fifth message (e.g., rx_final_msg) to the first reference device a as indicated by reference numeral 1630. Although not shown, the second reference device b may communicate the messages rx_poll_msg, tx_res_msg, and rx_final_msg with the normal electronic device c in the same way as indicated by reference numerals 1610-1630. The first reference device a, the second reference device b, and the normal electronic device c may communicate the messages rx_poll_msg, tx_res_msg, and rx_final_msg in the UWB method.

The first reference device a and the second reference device b may calculate distances to the normal electronic device c as indicated by reference numeral 1640. The first reference device a may calculate a distance between the first reference device a and the second reference device b, and a distance between the first reference device a and the normal electronic device c. The second reference device b may calculate a distance between the second reference b and the normal electronic device c. The second reference device b may calculate the distance to the normal electronic device c, and then may transmit the calculated distance information to the first reference device a as indicated by reference numeral 1650. The method for calculating the distances between the reference devices and the normal electronic device may use the method as shown in FIG. 4. A positioning method using UWB may be more exact than a GPS positioning method. When a sum of error values of two positioning reference points (first reference point and second reference point) falls within 17 m, positioning may be more exactly performed than in the case of an average GPS error.

FIG. 16B is a view illustrating an example of locating a position of the normal electronic device c based on calculated distance information.

The first reference device a may identify distance information from a current position a2 (first reference point) to a current position b2 (second reference point) of the second reference device b, and to a current position c2 (point) of the normal electronic device c. The first reference device a may calculate the position c2 of the normal electronic device c by the triangulation, based on a distance between the first reference device a and the second reference device b (a distance from a2 to b2), a distance between the first reference device a and the normal electronic device c (a distance from a2 to c2), and a distance between the second reference device b and the normal electronic device c (a distance from b2 to c2). The position of the electronic device may be calculated in the triangulation, based on the distances between the electronic devices as shown in FIG. 5.

The first reference device a may transmit refined position information of the electronic device to a server as indicated by reference numeral 1680. The server receiving the refined position (e.g., coordinates) information of the electronic device may process the information again and may provide the information to the electronic devices. In addition, the server may utilize the position information of the electronic device as big data.

Figure 17:
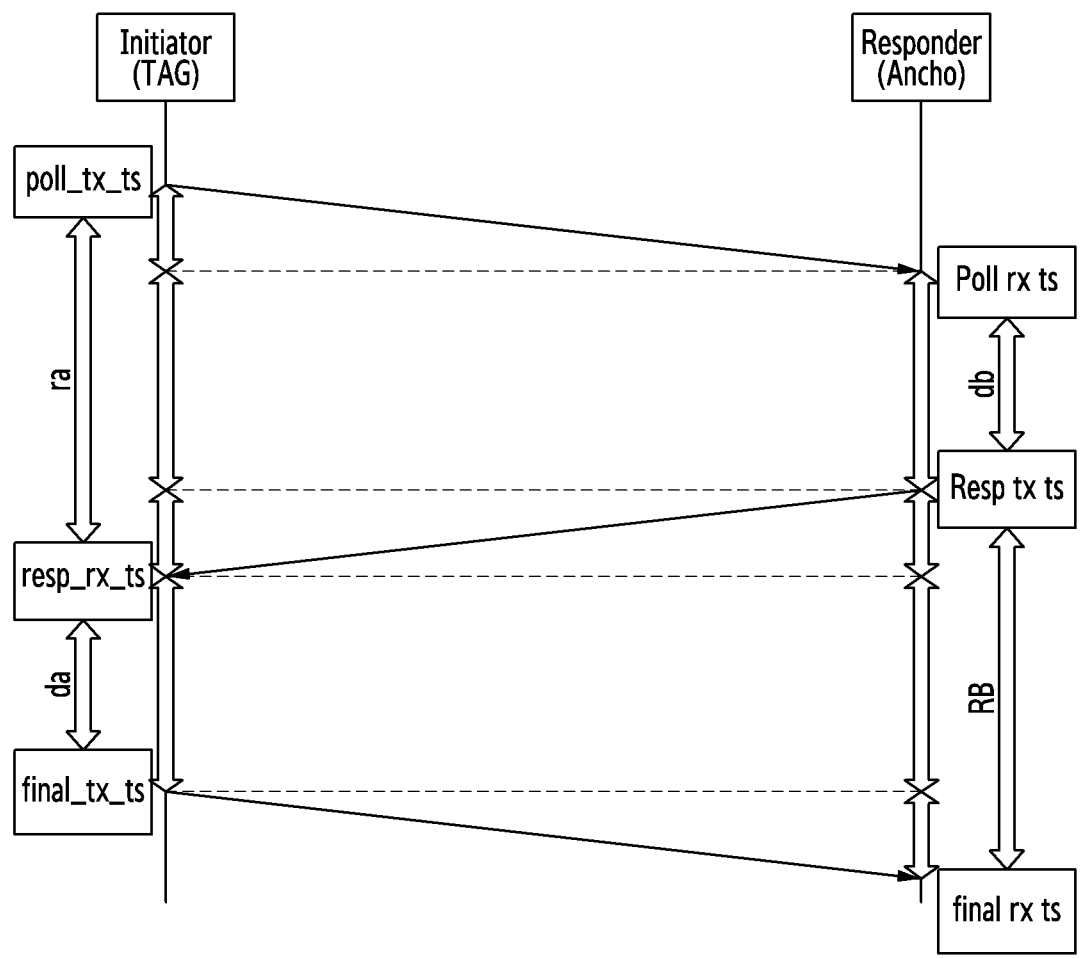
FIG. 17 is a diagram of examples of an algorithm for measuring distances between electronic devices in a positioning system, and message formats, according to an embodiment.

FIG. 17 is a diagram of examples of an algorithm for measuring distances between electronic devices and message formats in a positioning system, according to an embodiment. An initiator (TAG) may indicate a normal electronic device, and a responder (ancho) may indicate a reference device.

Referring to FIG. 17, message formats for setting a reference point between a master electronic device and normal electronic devices may have the structures as shown in Table 2 presented below:

TABLE 2

```
rx_poll_req_mov[ ]={CMD_TX_REQ_CHK_MOV,0x4,'M','O','V','E'};
tx_res_chk_mov[ ]={CMD_RX_RESP_MOV,0x16,
    /*ID*/0x01,/*Timestamp*/0,0,0,0,/*MovementRate*/0x00,/*gps*/0,0,0,0,0,0,0,0,0,0,0,0,0,0,0,0},
rx_result_mov[ ]={CMD_TX_RESULT_MOV,0x16*2,
    /*ID*/0x01,/*Timestamp*/0,0,0,0,/*MovementRate*/0x00,/*gps*/0,0,0,0,0,0,0,0,0,0,0,0,0,0,0,0,,
    /*ID*/0x02,/*Timestamp*/0,0,0,0,/*MovementRate*/0x00,/*gps*/0,0,0,0,0,0,0,0,0,0,0,0,0,0,0,0},
```

In Table 2, rx_poll_req_mov [ ] may have a format of req_check_mov_msg, tx_rex_chk_mov [ ] may have a format of res_check_mov_msg, and rx_result_mov [ ] may have a format of result_msg_table.

Message formats for calculating distances between reference devices and normal electronic devices may be as shown in Table 3 presented below:

TABLE 3 rx_poll_msg[ ]={CMD_RX_POLL,0x4,'P','O','L','L'};
tx_resp_msg[ ]={CMD_TX_RESPONSE,0x4, 'R','E','S','P'};
rx_final_msg[ ]={CMD_RX_FINAL,0x12,0,0,0,0,0,0,0,0,0,0,0,0,0,};

As shown in Table 3, the normal electronic device may transmit rx_final_msg filled with all of poll_tx_ts, resp_rx_ts, and final_tx_ts.

The positioning system may be utilized in a team sport. When a team sport is played, players may wear the electronic devices on specific positions (e.g., wrist or ankle). The electronic devices worn by the players may be devices registered at the positioning system. The electronic devices may include sensor modules, and the sensor module may include a movement detection sensor (e.g., a six-axis acceleration sensor). The electronic devices may track their movements by using the sensor modules at a positioning time. A position of an electronic device with a small amount of movement among the electronic devices may be set to a reference point. The positioning system may set positions of two electronic devices with the least amount of movement to reference points at the positioning time, without using a fixed reference point.

The electronic devices worn by the players may measure distance between the electronic devices based on RF positioning such as UWB (TODA positioning method)/WiFi (RSSI positioning method). The reference device set to the reference point may measure distances by communicating with normal electronic devices based on RF in a set RF positioning method. The electronic device of the reference point measuring distances to the normal electronic devices may refine positions of the normal electronic devices based on the measured distances. The positioning system according to various embodiments may not set a separate reference point (an anchor node, an access point, etc.), and may set a reference point at the positioning time and may locate positions of the moving players by the triangulation. Even in the case of an indoor sport in which it is difficult to receive a GPS signal, movements of players can be exactly tracked.

The electronic device of the reference point can locate positions of the electronic devices which are refined according to the players' movements, and the measured position information may be transmitted to a server. The server may accumulate the refined position information of the electronic devices, and may transmit the position information to the electronic devices to refine the positions of the electronic devices. The positioning system can exactly locate positions of players in a team sport, and can calibrate accuracy of movements.

According to various embodiments, a method for locating positions of electronic devices may include receiving, by a master electronic device, movement information of the electronic devices, and setting the electronic devices to a first reference device, a second reference device, or a normal electronic device, based on the movement information, calculating, by the first reference device, a distance between the first reference device and the second reference device and a distance between the first reference device and the normal electronic device, calculating, by the second reference device, a distance between the second reference device and the normal electronic device, and transmitting the calculated distance information to the first reference device, and calculating, by the first reference device, a position of the normal electronic device by a triangulation method, based on the distances among the first reference device, the second reference device, and the normal electronic device.

The method for locating the positions of the electronic devices may further include transmitting, by the first reference device, the calculated position information of the electronic devices to a server, and converting the first reference device into the master electronic device.

Setting, by the master electronic device, the reference devices, may include transmitting a message requesting tracking of a movement to the normal electronic devices, receiving a movement tracking message including identification information of the normal electronic devices and the measured movement information, generating a resulting message table based on the received movement tracking message, and transmitting the resulting message table to the normal electronic devices, and setting two electronic devices with small amounts of movement among the electronic devices to the first reference device and the second reference device, respectively, based on the movement information, and setting the other electronic devices to the normal electronic devices.

The method for locating the positions of the electronic devices may further include generating the movement tracking message of the normal electronic device, and generating the movement tracking message may include: when the tracking of the movement is requested, measuring a movement distance between a current position and a previous position, and generating the movement tracking message including movement information according to the measured movement distance, and the identification information of the electronic device, and transmitting the movement tracking message to the master electronic device.

Measuring, by the first reference device, the distances may include measuring the distance between the first reference device and the second reference device by UWB positioning, and measuring the distance between the first reference device and the normal electronic device by the UWB positioning.

According to various embodiments, a method for locating a position of an electronic device in a positioning system may include, setting, by a master electronic device, electronic devices to a first reference device, a second reference device, or a normal electronic device, respectively, based on movement information of the electronic devices, calculating, by the first reference device, a distance between the first reference device and the second reference device and a distance between the first reference device and the normal electronic device, calculating, by the second reference device, a distance between the second reference device and the normal electronic device, and transmitting the calculated distance information to the first reference device, and calculating, by the first reference device, positions of the electronic devices by a triangulation method, based on the distance information among the first reference device, the second reference device, and the normal electronic device.

The method for locating the position of the electronic device in the positioning system may further include transmitting refined position information of the electronic device to a server, and transmitting, by the server, the refined position information to the electronic devices.

Figure 18:
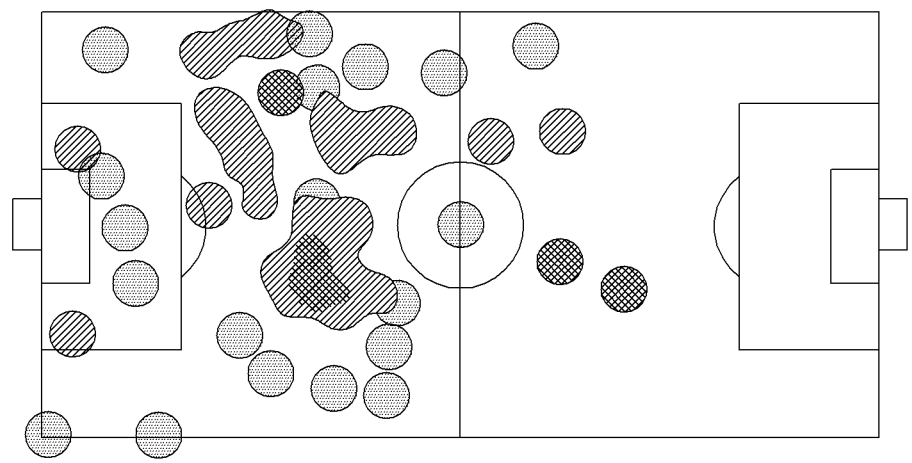
FIG. 18 is a diagram of an example of application of a positioning system according to various embodiments to soccer, according to an embodiment.

Calculating the distance may include calculating the distance between the first reference device and the second reference device and the distance between the first reference device and the normal electronic device, through a UWB positioning module FIG. 18 is a diagram of an example of application of the positioning system, according to an embodiment. FIG. 18 is a view illustrating an example of a heat map of amounts of motion/movement indexes of players.

Figure 19:
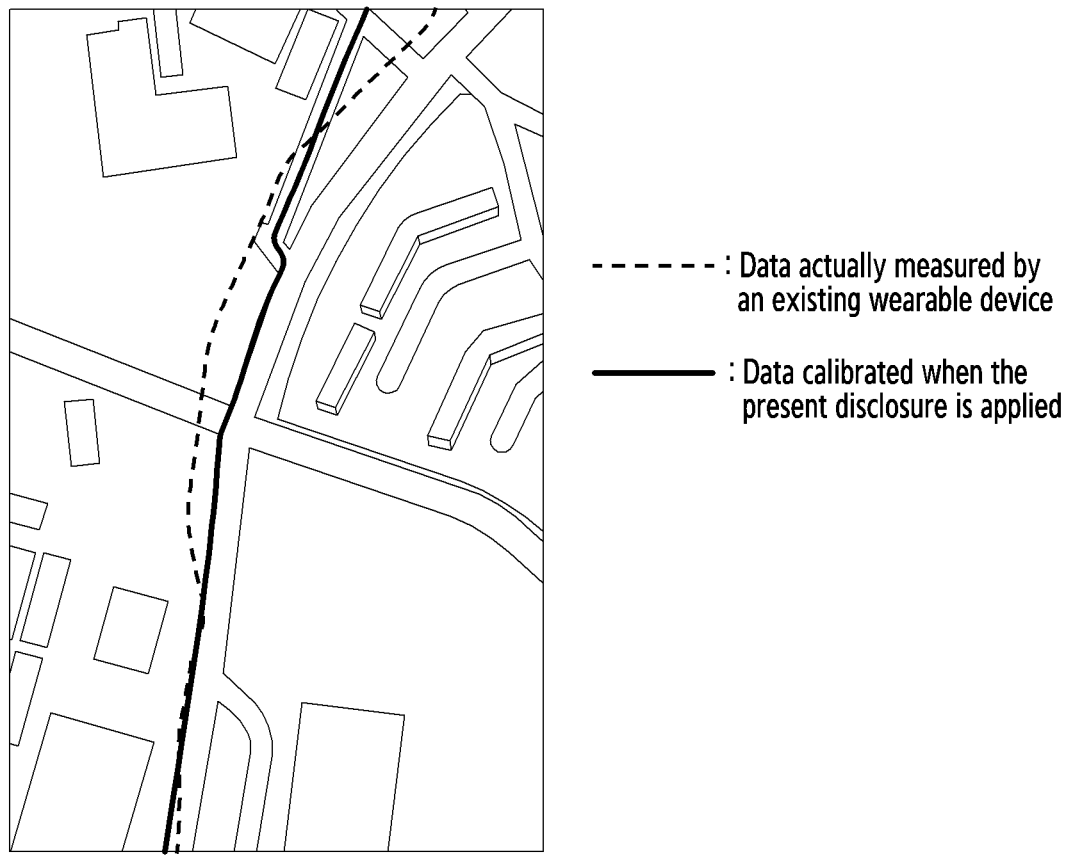
FIG. 19 is a diagram of an example of application of a positioning system according to an embodiment.

FIG. 19 is a diagram an example of application of the positioning system, according to an embodiment. Referring to FIG. 19, when team running (e.g., marathon, jogging, etc.) of three or more persons is performed, more exact path logging and distance information can be provided.

Figure 20:
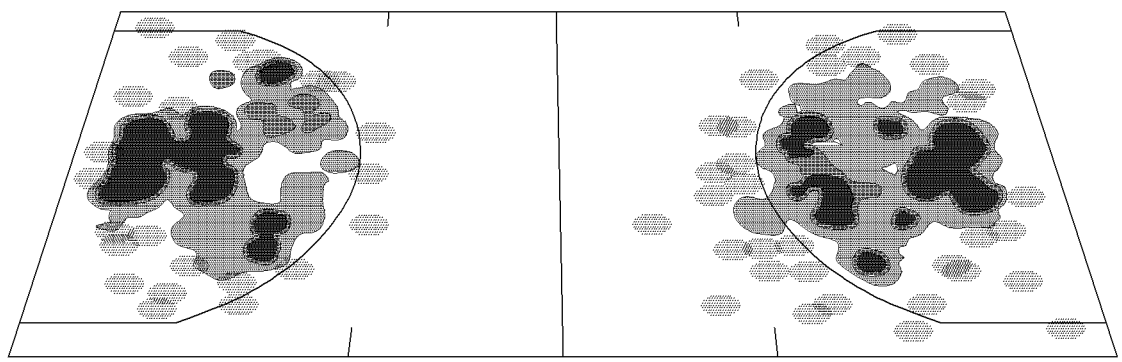
FIG. 20 is a diagram an example of application of a positioning system, according to an embodiment.

FIG. 20 is a diagram an example of application of the positioning system, according to an embodiment, and illustrates an example of a heat map of amounts of motion/movement indexes of players. The positioning system according to various embodiments may be worn by players and may establish team data based on players' basic amounts of activity, and may utilize the team data as sport information. The positioning system may establish a heat map, a passing map, and a shooting map of each player of a team sport, and may provide an individual's amount of motion and an amount of motion for each position. In addition, players' instantaneous velocities and acceleration data may be generated.

When positions of a plurality of electronic devices are located, an electronic device with the least amount of movement may be set to a reference device, and the reference device may calculate distances between the electronic devices and may locate the positions of the electronic devices by using the triangulation. Accordingly, the positions of the plurality of electronic devices can be located without a fixed measuring reference device.

In addition, when positions of a plurality of electronic devices are located, the positions of the electronic devices can be exactly located without a reference device by utilizing RF positioning technology such as UWB/WiFi.

In addition, in a team sport (e.g., ball sports), a position of each player wearing a wearable electronic device can be determined in real time, and more exact position information can be recorded in an outdoor space, and various sport big data can be generated and applied.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A positioning system comprising at least four electronic devices to locate a position of at least one of the at least three electronic devices, each of the at least four electronics devices comprising:
a sensor configured to track a movement of an electronic device including the sensor;
communication circuitry configured to communicate with other electronic devices;
a memory; and
at least one processor operatively connected with the sensor, the communication circuitry, and the memory, wherein one of the at least four electronic devices is set to a master electronic device,
wherein a processor of the master electronic device is configured to:
request remaining electronic devices other than the master electronic device to track movements;
receive movement information of the remaining electronic devices;
generate a resulting movement message based on the movement information received from the remaining electronic devices and a movement of the master electronic device;
transmit the resulting movement message to the remaining electronic devices; and
set an electronic device with a least amount of movement to a first reference device, an electronic device with a second least amount of movement to a second reference device, and one of the at least one remaining electronic devices to a normal electronic device, respectively, based on the movement information,
wherein a processor of the first reference device is configured to:
calculate, based on the resulting movement message, a first distance between the first reference device and the second reference device and a second distance between the first reference device and the normal electronic device;
receive, from the second reference device, distance information including a third distance between the second reference device and the normal electronic device; and
calculate a position of the normal electronic device by a triangulation method, based on the first distance, the second distance, and the third distance, and
wherein a processor of the second reference device is configured to:
calculate the third distance between the second reference device and the normal electronic device, and
transmit, to the first reference device, the distance information including the third distance.

2. The apparatus of claim 1, wherein the processor of the first reference device is further configured to transmit the calculated position information of the normal electronic devices to a server.

3. The apparatus of claim 1, wherein the processors of each of the remaining electronic devices are further configured to track movement of each of the remaining electronic devices detected via the sensor when the master electronic device requests tracking of movements, and to transmit the movement information to the master electronic device.

4. The apparatus of claim 3, wherein the sensor is an acceleration sensor.

5. The apparatus of claim 2, wherein the processor of the first reference device is further configured to: measure the first distance between the first reference device and the second reference device and the second distance between the first reference device and the normal electronic device through an RF positioning module, receive the third distance between the second reference device and the normal electronic device from the second reference device, and calculate the position of the normal electronic device by the triangulation method, based on the first distance, the second distance, and the third distance.

6. The apparatus of claim 5, wherein the RF positioning module is an ultra wide band (UWB) communication module, and
wherein the processor of the first reference device is further configured to calculate the first distance and the second distance, based on an RF arrival time of the UWB communication module.

7. A method for locating positions of electronic devices, the method comprising:
by a master electronic device of the electronic devices:
transmitting a message requesting for tracking movements to remaining electronic devices other than the master electronic device;
receiving movement information of the remaining electronic devices;
generating a resulting movement message based on the received movement information and a movement of the master electronic device;
transmitting the resulting movement message to the remaining electronic devices; and
setting an electronic device with a least amount of movement to a first reference device, an electronic device with a second least amount of movement to a second reference device, and one of at least one of the remaining electronic devices to a normal electronic device, respectively, based on the movement information, by the first reference device:
calculating, based on the resulting movement messages, a first distance between the first reference device and the second reference device and a second distance between the first reference device and the normal electronic device;
receiving, from the second reference device, distance information including a third distance between the second reference device and the normal electronic device; and
calculating a position of the normal electronic device by a triangulation method, based on the first distance, the second distance, and the third distance, and
by the second reference device:
calculating the third distance between the second reference device and the normal electronic device; and
transmitting, to the first reference device, the distance information including the third distance.

8. The method of claim 7, further comprising transmitting, by the first reference device, the calculated position information of the normal electronic device to a server.

9. The method of claim 7, further comprising generating a movement tracking message of the normal electronic device,
wherein generating the movement tracking message comprises:
when the tracking of the movement is requested, measuring a movement distance between a current position and a previous position; and
generating movement information according to the measured movement distance, and the identification information of the normal electronic device, and transmitting the movement tracking message to the master electronic device.

10. The method of claim 7, wherein calculating, by the first reference device, the first distance and the second distance comprises:
measuring the first distance between the first reference device and the second reference device by ultra wide band (UWB) positioning; and
measuring the second distance between the first reference device and the normal electronic device by the UWB positioning.

11. A positioning system of electronic devices, the positioning system comprising:
a master electronic device configured to receive movement information of the electronic devices, and to set an electronic device with a least amount of movement to a first reference device, an electronic device with a second least amount of movement to a second reference device, and at least one remaining electronic device to at least one normal electronic device, respectively, based on the movement information;
the first reference device configured to calculate a first distance between the first reference device and the second reference device and a second distance between the first reference device and the normal electronic device, to receive, from the second reference device, distance information including a third distance between the second reference device and the normal electronic device, and to calculate a position of the normal electronic device by a triangulation method, based on the first distance, the second distance, and the third distance;
the second reference device configured to calculate the third distance between the second reference device and the normal electronic device, and to transmit, to the first reference device, the distance information including the third distance; and
the at least one normal electronic device configured to transmit a message for calculating distances to the reference devices to the first reference device and the second reference device.

12. The positioning system of claim 11, further comprising a server,
wherein the first reference device is configured to transmit refined position information of the electronic devices to the server.

13. The positioning system of claim 11, wherein the master electronic device is further configured to transmit a message for requesting tracking of a movement to the electronic devices, to receive a movement tracking message comprising identification information of the electronic devices and the measured movement information, to generate a resulting movement tracking message based on the movement tracking message and to transmit the resulting movement tracking message to the electronic devices.

14. The positioning system of claim 12, wherein the first reference device is further configured to: measure the first distance between the first reference device and the second reference device and the second distance between the first reference device and the normal electronic device through an RF positioning module, receive the third distance between the second reference device and the normal electronic device from the second reference device, and calculate the position of the normal electronic device by the triangulation method, based on the first distance, the second distance, and the third distance.

15. The positioning system of claim 14, wherein the RF positioning module is an ultra wide band (UWB) communication module, and
wherein the first reference device is further configured to calculate the first distance and the second distance, based on an RF arrival time of the UWB communication module.

16. A method for locating a position in a positioning system, the method comprising:
receiving, by a master electronic device, movement information of a plurality of electronic devices;
setting, by the master electronic device, an electronic device with a least amount of movement to a first reference device, an electronic device with a second least amount of movement to a second reference device, and one of at least one remaining electronic device to a normal electronic device, respectively, based on the movement information of the plurality of electronic devices;

calculating, by the first reference device, a first distance between the first reference device and the second reference device and a second distance between the first reference device and the normal electronic device;

calculating, by the second reference device, a third distance between the second reference device and the normal electronic device;

transmitting, by the second reference device, the distance information including the third distance to the first reference device; and calculating, by the first reference device, positions of the plurality of electronic devices by a triangulation method, based on the first distance, the second distance, and the third distance.

17. The method of claim 16, further comprising:
transmitting refined position information of the electronic device to a server; and
transmitting, by the server, the refined position information to the plurality of electronic devices.

18. The method of claim 16, wherein calculating the first distance and second distance comprises: calculating the first distance between the first reference device and the second reference device and the second distance between the first reference device and the normal electronic device, through an ultra wide band (UWB) positioning module.

* * * * *